US007684155B1

(12) United States Patent
Huang et al.

(10) Patent No.: US 7,684,155 B1
(45) Date of Patent: Mar. 23, 2010

(54) DISK DRIVE WITH AN ACTUATOR LATCH HAVING A BIASING BALL AT LEAST PARTIALLY WITHIN A SEATING CAVITY ADJOINING A RETENTION BORE

(75) Inventors: Lidu Huang, Danville, CA (US); Peter G. Robinson, Concord, CA (US); Scott E. Watson, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 705 days.

(21) Appl. No.: 11/650,276

(22) Filed: Jan. 5, 2007

(51) Int. Cl.
*G11B 21/22* (2006.01)
(52) U.S. Cl. ..................................... 360/256
(58) Field of Classification Search ....... 360/256–256.6
See application file for complete search history.

(56) References Cited

U.S. PATENT DOCUMENTS

| 5,319,511 | A |   | 6/1994  | Lin              |          |
|-----------|---|---|---------|------------------|----------|
| 5,703,735 | A |   | 12/1997 | Bleeke           |          |
| 5,734,527 | A | * | 3/1998  | Reinhart         | 360/256.2|
| 5,793,572 | A |   | 8/1998  | Lalouette et al. |          |
| 5,822,155 | A |   | 10/1998 | Oveyssi et al.   |          |
| 6,381,103 | B1|   | 4/2002  | Misso et al.     |          |
| 6,498,703 | B2|   | 12/2002 | Misso et al.     |          |
| 6,535,357 | B1|   | 3/2003  | Misso et al.     |          |
| 6,535,358 | B1|   | 3/2003  | Hauert et al.    |          |
| 6,728,074 | B2|   | 4/2004  | Hanada et al.    |          |
| 6,744,604 | B2| * | 6/2004  | Misso            | 360/256  |
| 7,379,272 | B2| * | 5/2008  | Kato et al.      | 360/256.4|
| 7,423,845 | B2| * | 9/2008  | Arikawa          | 360/256.4|
| 2007/0146937 | A1 | * | 6/2007 | Akama et al.   | 360/256.4|

* cited by examiner

*Primary Examiner*—Mark Blouin

(57) ABSTRACT

A disk drive comprises a disk drive base, an actuator rotatably coupled to the disk drive base, a magnet disposed adjacent the actuator, and a latch. The latch is coupled to the disk drive base. The latch includes a latch body, a retention bore, a seating cavity, and a biasing ball. The retention bore extends into the latch body along a bore longitudinal axis. The retention bore includes a ball entrance defining a ball entrance diameter. The seating cavity extends from within the retention bore into the latch body. The seating cavity has an interior dimension perpendicular to the bore longitudinal axis greater than the ball entrance diameter. The biasing ball is disposed at least partially in the retention bore and at least partially within the seating cavity. The biasing ball comprises a magnetic material and has a ball diameter greater than the ball entrance diameter.

33 Claims, 20 Drawing Sheets

DISK DRIVE WITH AN ACTUATOR LATCH HAVING A BIASING BALL AT LEAST PARTIALLY WITHIN A SEATING CAVITY ADJOINING A RETENTION BORE

FIELD OF THE INVENTION

The present invention relates generally to disk drives, and in particular actuator latches for disk drives.

BACKGROUND

The typical hard disk drive includes a head disk assembly (HDA) and a printed circuit board assembly (PCBA) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head may include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

The spindle motor typically includes a rotatable spindle motor hub, a magnet attached to the spindle motor hub, and a stator. Various coils of the stator are selectively energized to form an electromagnetic field that pulls/pushes on the magnet, thereby imparting a rotational motion onto the spindle motor hub. Rotation of the spindle motor hub results in rotation of the attached disks.

The head stack assembly includes an actuator assembly, at least one head gimbal assembly, and a flex circuit assembly. A conventional "rotary" or "swing-type" actuator assembly typically includes an actuator having an actuator body. The actuator body has a pivot bearing cartridge to facilitate rotational movement of the actuator assembly. One or more actuator arms extend from the actuator body. Each actuator arm supports at least one head gimbal assembly that includes a head. An actuator coil is supported by the actuator body opposite the actuator arms. The actuator coil is configured to interact with one or more magnets, typically a pair, to form a voice coil motor. The printed circuit board assembly controls current passing through the actuator coil that results in a torque being applied to the actuator.

A latching mechanism is provided to facilitate latching of the actuator in a parked position when the heads are not being used to interact with the tracks on the disk. In the parked position, the actuator is positioned with the heads either at an inner diameter (ID) of the disk or at or beyond an outer diameter (OD) of the disk such as upon a ramp. A crash stop coupled to the disk drive base is provided to limit rotation of the actuator in a given direction. Another crash stop may be provided to limit actuator rotation in an opposite rotational direction. The latching mechanism may additionally function as one of the crash stops.

Depending upon the particular latch configuration, the latch may be biased in either an open or closed position. The latch may include a plastic latch body and a biasing element such as a spring or a ferromagnetic material. A ferromagnetic biasing element magnetically interacts with the magnet of the actuator voice coil motor so as to bias the angular position of the actuator. The biasing element may be coupled to the latch body by being press-fit within a cavity formed in the latch body. Use of adhesives to retain the biasing element in the cavity is often undesirable from an assembly and/or a contamination point of view. Latching and crash-stop operation subjects the latch to repeated impacts. As a result the biasing element may become dislodged or loosened.

Accordingly, it is contemplated that there is need in the art for an improved latch biasing element configuration for maintaining a relatively secure attachment and for facilitating an ease of assembly.

SUMMARY

According to an aspect of the present invention, there is provided a disk drive having a disk drive base, an actuator rotatably coupled to the disk drive base, a magnet disposed adjacent the actuator, and a latch. The latch is coupled to the disk drive base. The latch includes a latch body, a retention bore, a seating cavity, and a biasing ball. The retention bore extends into the latch body along a bore longitudinal axis. The retention bore includes a ball entrance defining a ball entrance diameter. The seating cavity extends from within the retention bore into the latch body. The seating cavity has an interior dimension perpendicular to the bore longitudinal axis greater than the ball entrance diameter. The biasing ball is disposed at least partially in the retention bore and at least partially within the seating cavity. The biasing ball comprises a magnetic material and has a ball diameter greater than the ball entrance diameter.

According to another aspect of the present invention the latch comprises a latch body, a retention bore, a bore weakening cavity, and a biasing ball. The bore weakening cavity extends into the latch body towards the retention bore. The biasing ball is disposed at least partially in the retention bore and adjacent the bore weakening cavity. The biasing ball comprises a magnetic material and has a ball diameter greater than the ball entrance diameter. The biasing ball has a ball center. A radial line from the ball center perpendicular to the bore longitudinal axis extends into the bore weakening cavity.

DESCRIPTION OF THE PREFERRED EMBODIMENTS

Figure 1:
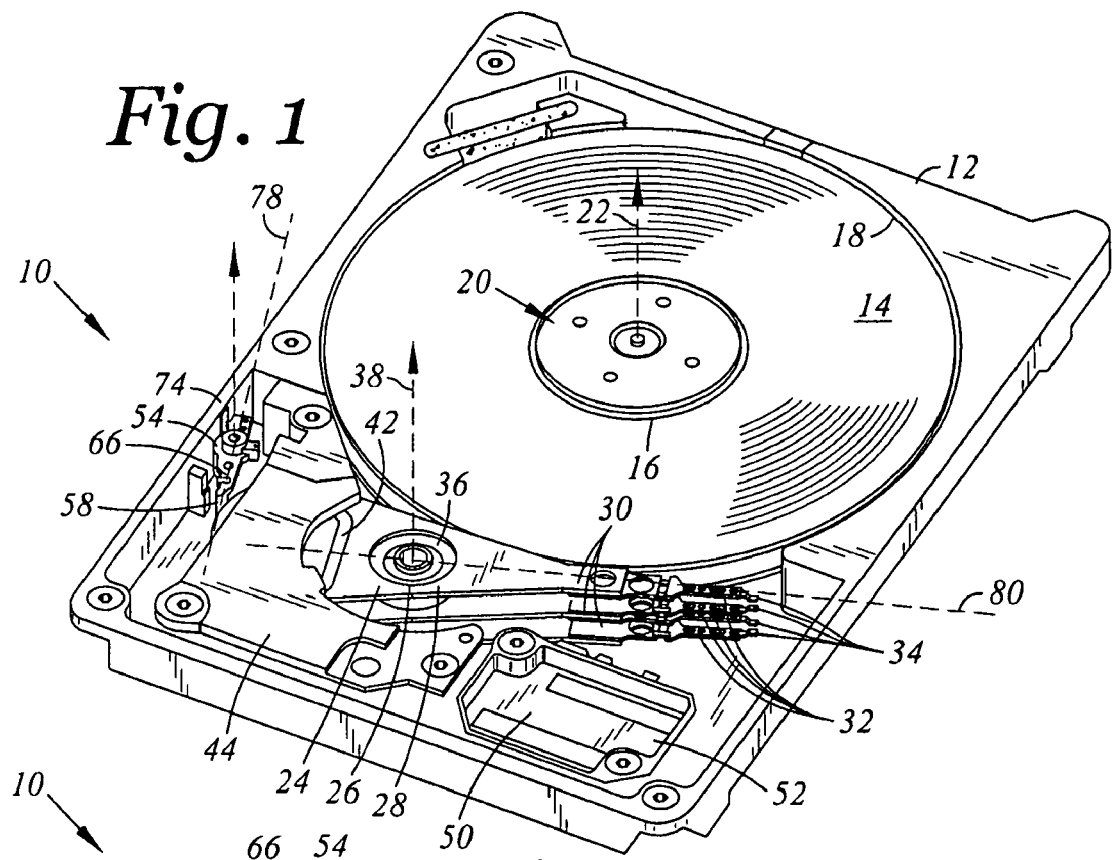
FIG. 1 is a top perspective view of a disk drive (without any cover shown) including a latch (in a closed position) and an actuator (in a parked position) according to an embodiment of the present invention.
Figure 2:
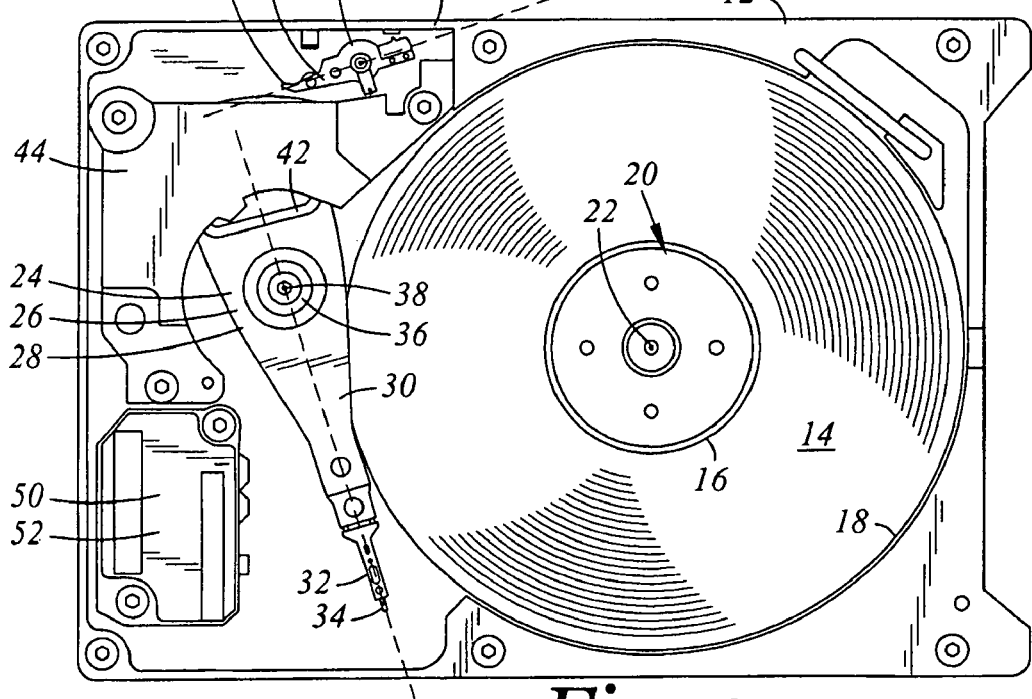
FIG. 2 is a top plan view of a disk drive according to an embodiment of the present invention.
Figure 3:
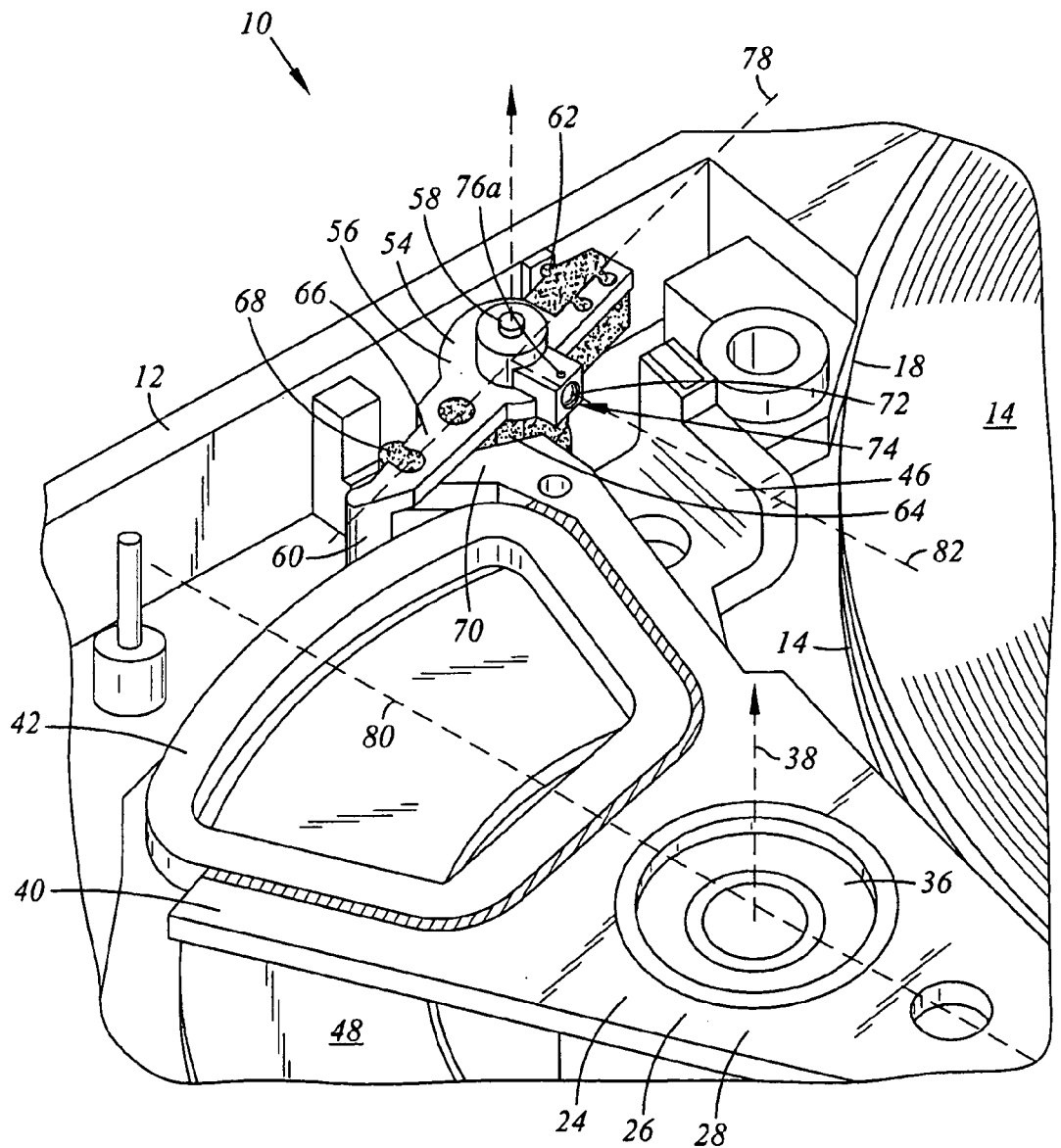
FIG. 3 is an enlarged top perspective view of a portion of a disk drive according to an embodiment of the present invention (without a top VCM plate shown for ease of illustration) with the latch in a closed position and a portion of the actuator in a parked position.

FIGS. 1 and 2 depict a top perspective view and a top plan view, respectively, of a disk drive 10 according to an embodiment of the present invention. The disk drive 10 includes a head disk assembly (HDA) and a printed circuit board assembly (PCBA) (not shown). The head disk assembly includes a disk drive housing having disk drive housing members, such as a disk drive base 12 and a cover (not shown for ease of illustration of the internal disk drive components). The disk drive base 12 and the cover collectively house disks 14. A single disk or additional disks may be utilized. Each disk 14 includes an inner diameter (ID) 16 and an outer diameter (OD) 18. Each disk 14 further includes a plurality of tracks for storing data. The head disk assembly further includes a spindle motor 20 for rotating the disks 14 about a disk rotation axis 22. The head disk assembly further includes a head stack assembly 24 rotatably attached to the disk drive base 12 in operable communication with the disks 14. The head stack assembly 24 includes an actuator 26.

The actuator 26 includes an actuator body 28 and actuator arms 30 that extend from the actuator body 28. For angular reference purposes, each actuator arm 30 may define an actuator arm longitudinal axis 80. Distally attached to the actuator arms 30 are suspension assemblies 32. Each of the suspension assemblies 32 supports a head 34. A suspension assembly 32 with a head 34 is referred to as a head gimbal assembly (HGA). It is contemplated that the number of actuator arms and HGAs may vary depending upon the number of disks and disk surfaces utilized.

Each head 34 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 14. The disk 14 includes opposing disk surfaces. In magnetic recording applications the disk surface typically includes one or more magnetic layers. Data may be recorded along annular regions on a disk surface.

The head stack assembly 24 may be pivoted to radially position each head 34 between the outer diameter 18 and the inner diameter 16 of the disk 14. In the embodiment shown, the actuator body 28 includes a bore, and the actuator 26 further includes a pivot bearing cartridge 36 engaged within the bore for facilitating the actuator body 28 to rotate between limited positions about an axis of rotation 38.

The actuator 26 further includes a coil support element 40 that extends from one side of the actuator body 28 opposite the actuator arms 30. The coil support element 40 is configured to support a coil 42. A top VCM plate 44 may be provided as shown in FIGS. 1 and 2. The top VCM plate 44 is not shown in FIGS. 3-10 so as to ease illustration of the other disk drive components. A bottom VCM plate 46 with an attached VCM magnet 48 may also be provided as can be seen in FIGS. 3-10. The coil 42 is positioned between the VCM magnet 48 and the top VCM plate 44 to form a voice coil motor for controllably rotating the actuator 26.

The head stack assembly 24 further includes a flex cable assembly 50 (details of which are not shown for ease of illustration the actuator 26; for example a flex cable and pre-amplifier circuitry is not shown) with a cable connector 52. The cable connector 52 is attached to the disk drive base 12 and is disposed in electrical communication with the printed circuit board assembly. The flex cable assembly 50 supplies current to the coil 42 and carries signals between the heads 34 and the printed circuit board assembly.

With this configuration, current passing through the coil 42 results in a torque being applied to the actuator 26. A change in direction of the current through the coil 42 results in a change in direction of the torque applied to the actuator 26. It is contemplated that other magnet, VCM plate, coil and magnet support configurations may be utilized, such as a multiple coil arrangements, single or double VCM plates and a vertical coil arrangement.

Figure 4:
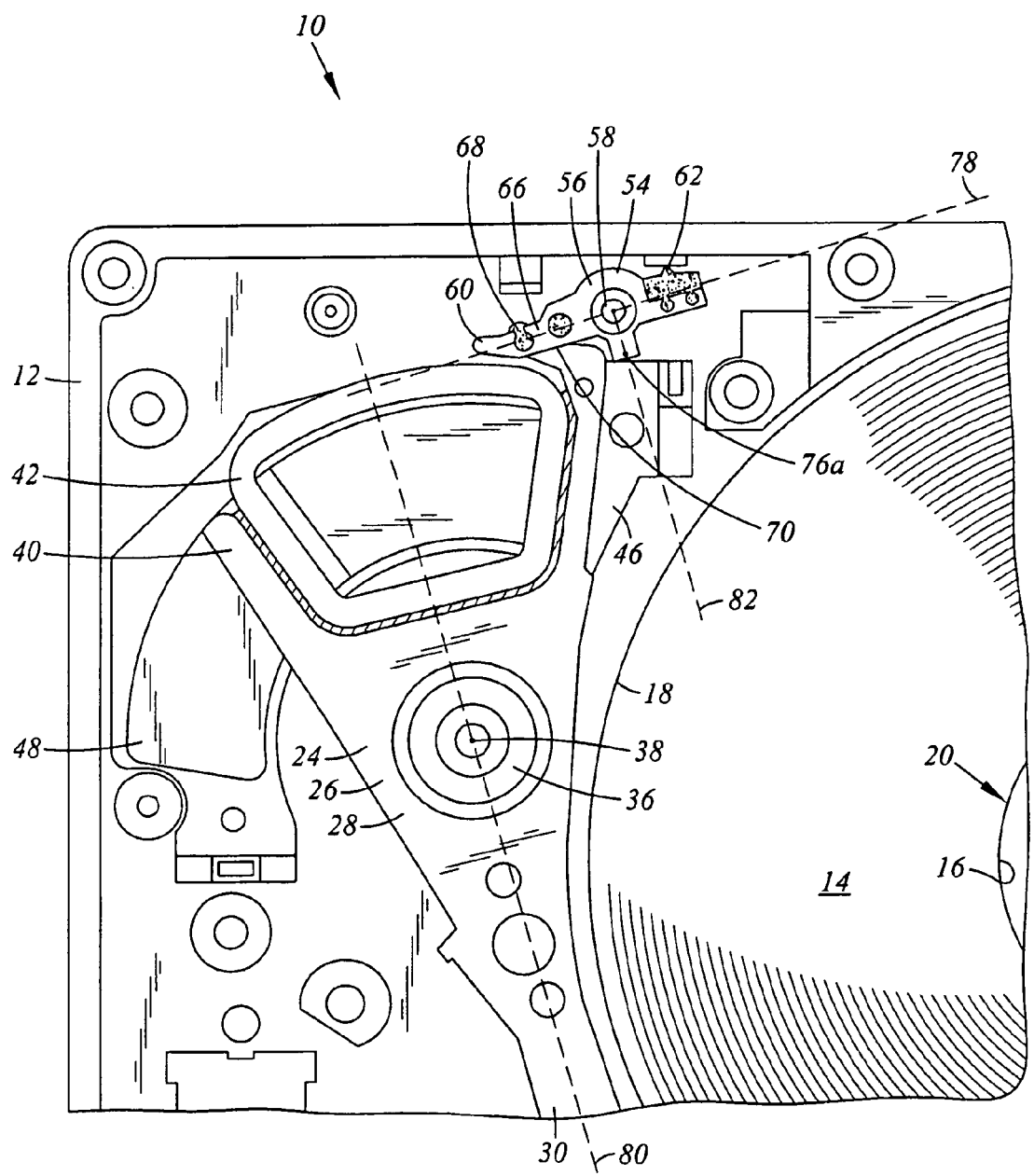
FIG. 4 is a top plan view of the portion of the disk drive of FIG. 3.
Figure 5:
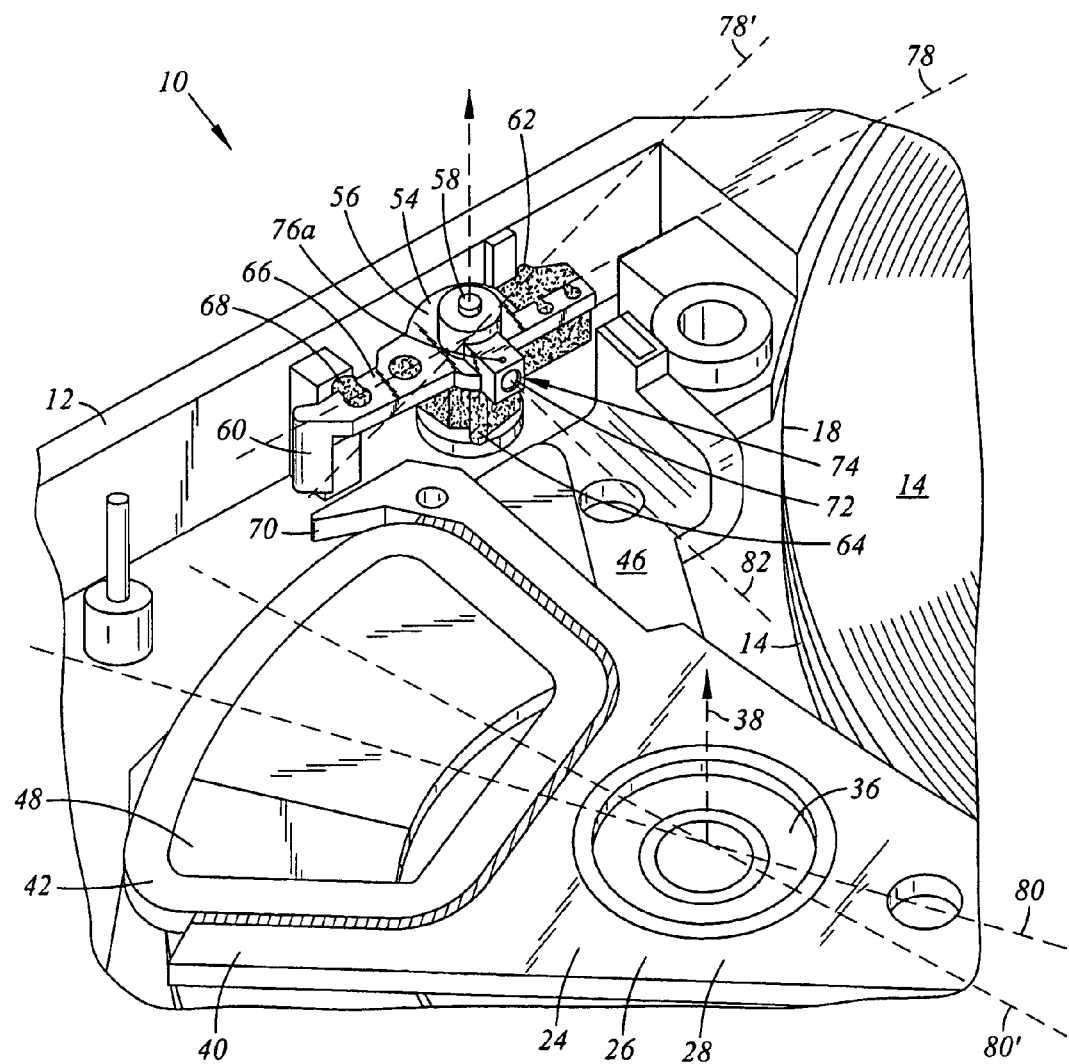
FIG. 5 is an enlarged top perspective view of a portion of the disk drive according to an embodiment of the present invention with the latch in an open position and the actuator in an operable position.
Figure 6:
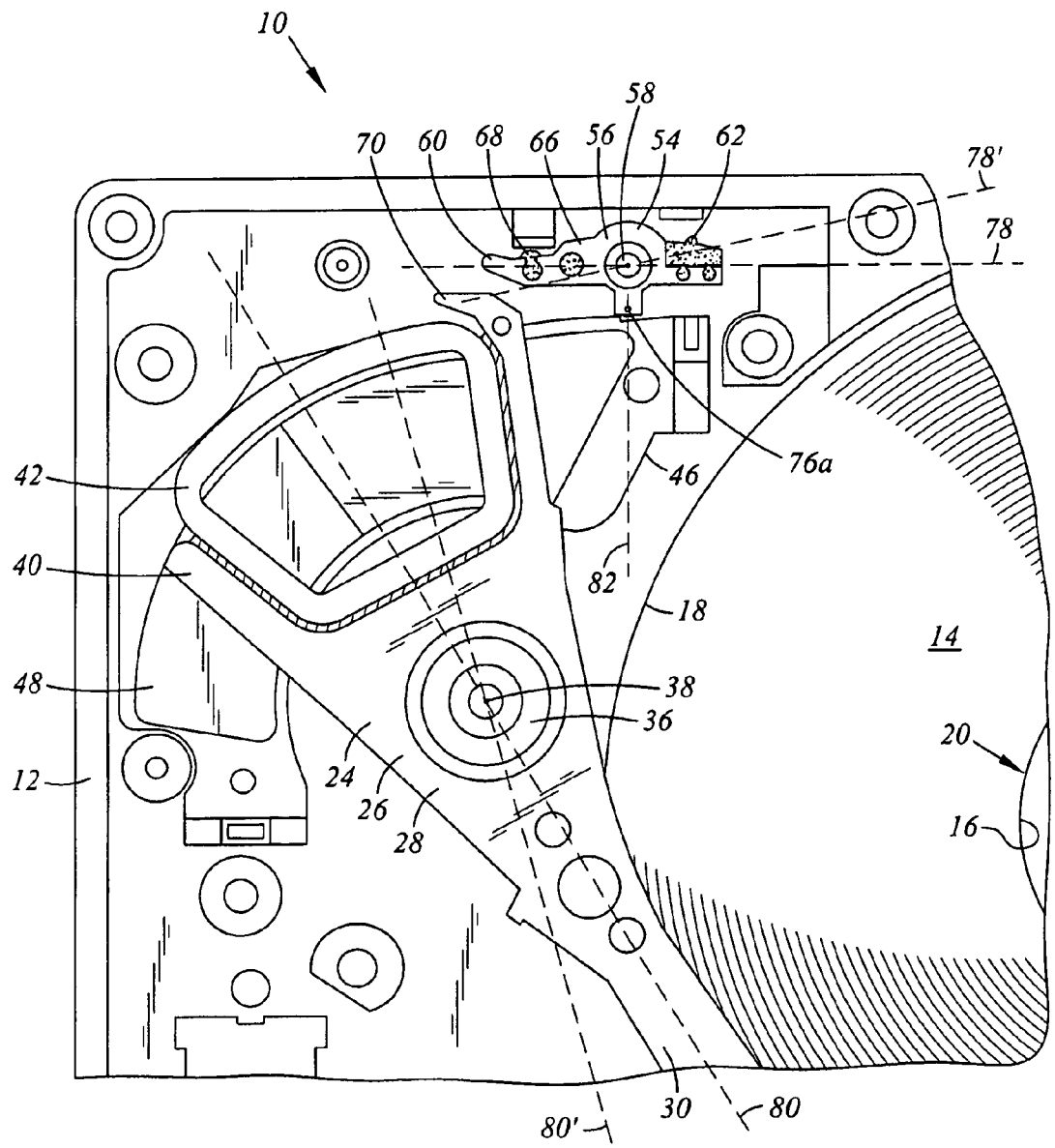
FIG. 6 is a top plan view of the portion of the disk drive of FIG. 5.
Figure 7:
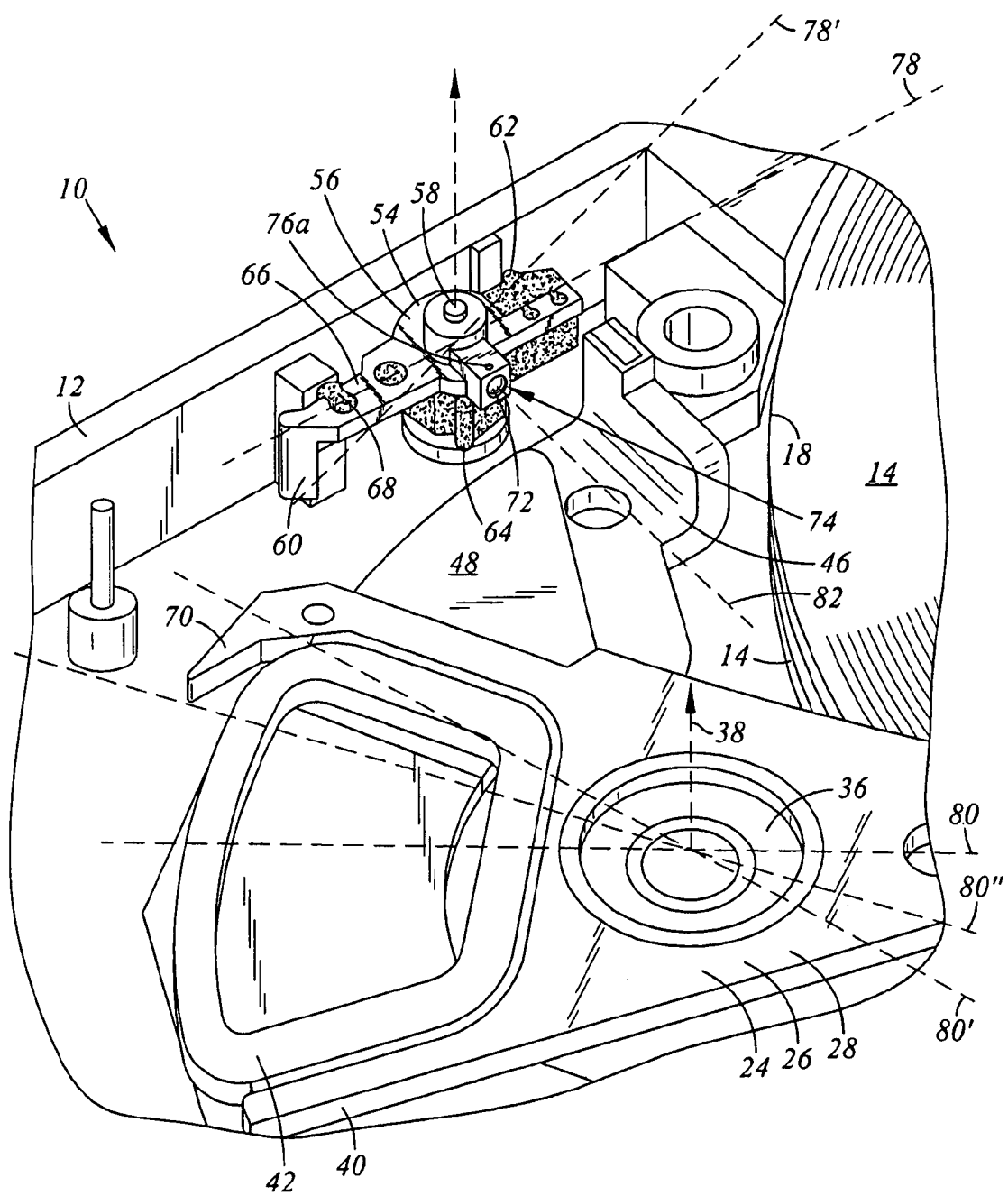
FIG. 7 is an enlarged top perspective view of a portion of the disk drive with the latch in an open position and the actuator in an extreme angular position (rotated fully counter-clockwise)
Figure 8:
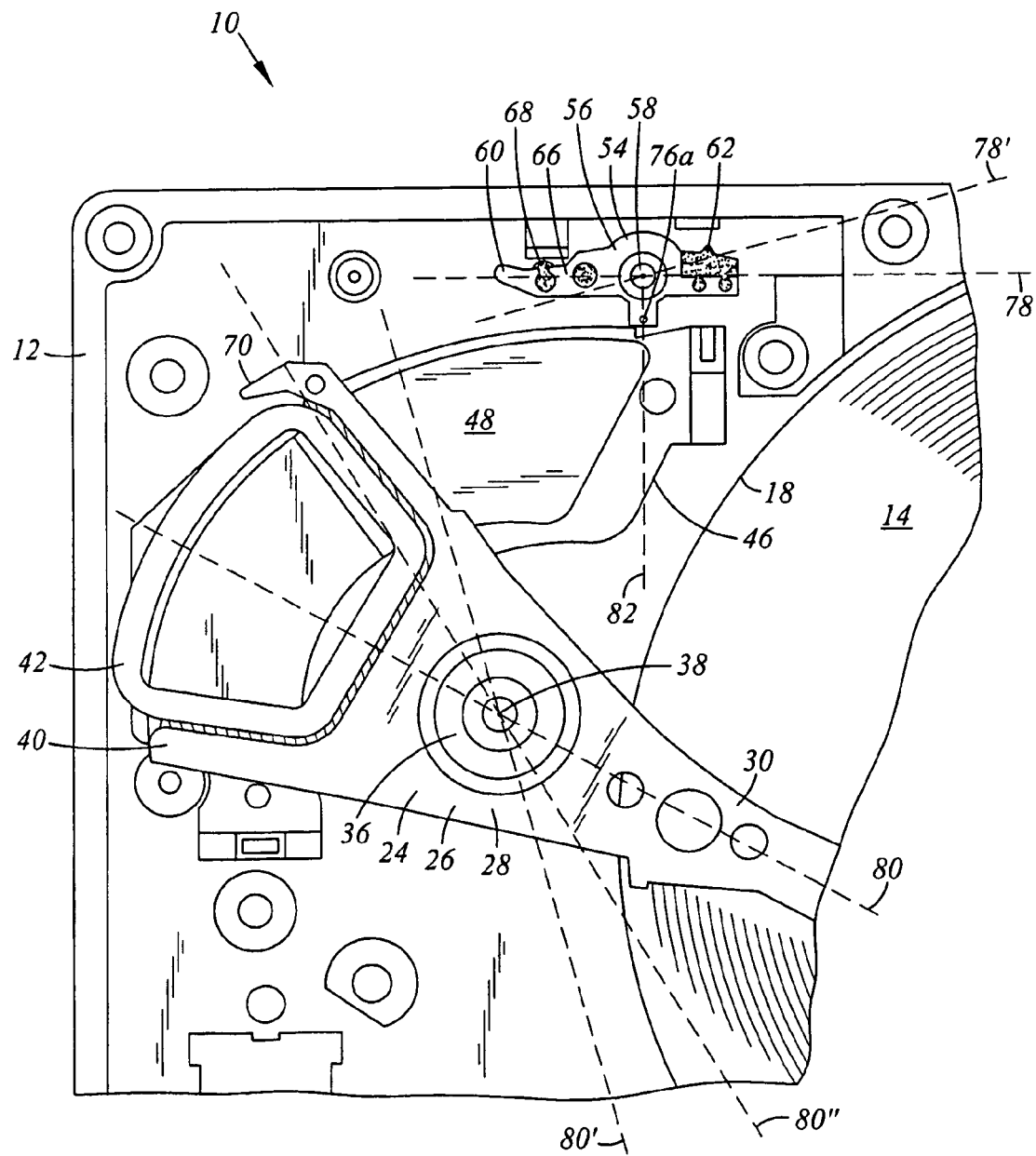
FIG. 8 is a top plan view of the portion of the disk drive of FIG. 7.
Figure 9:
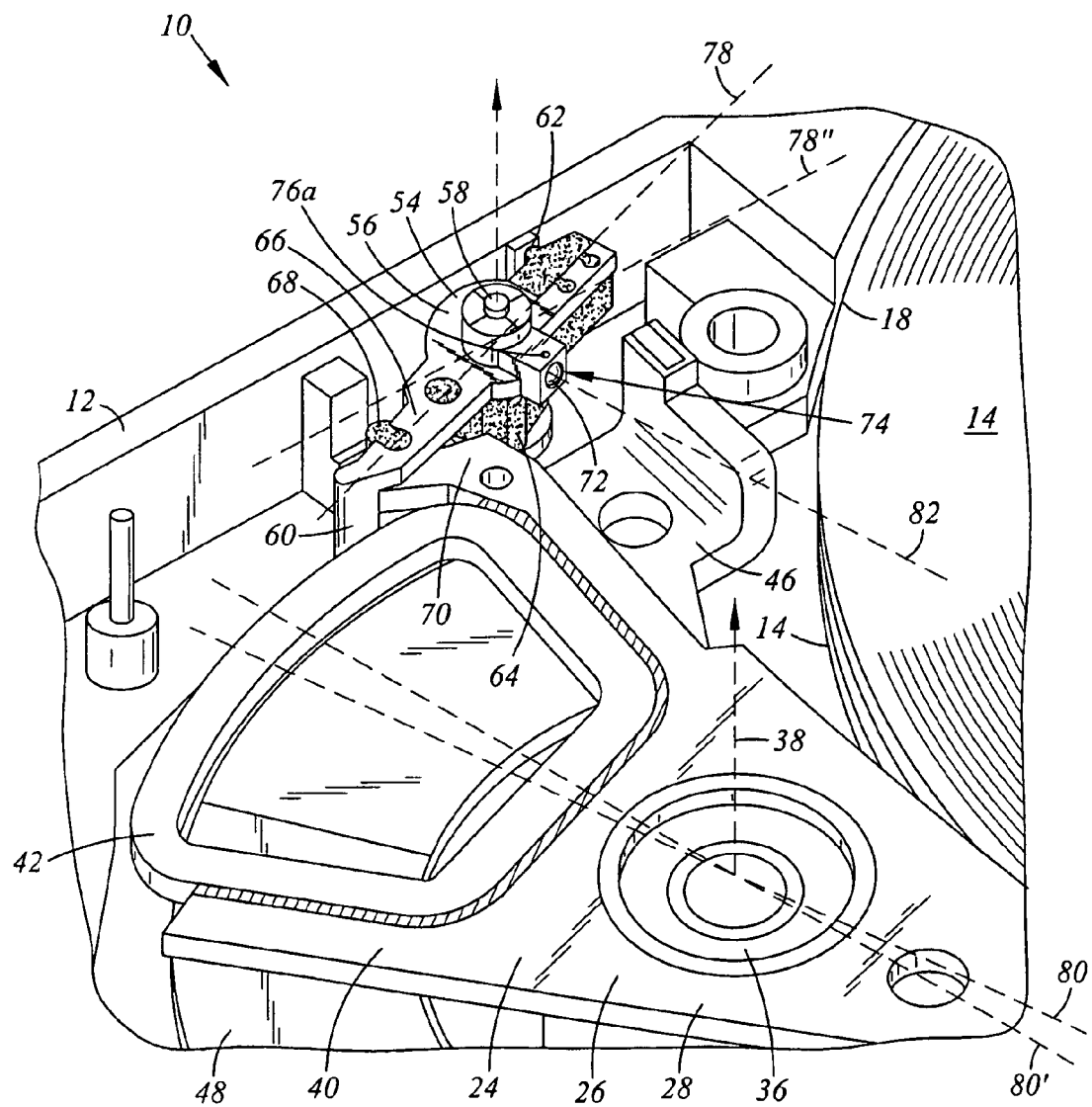
FIG. 9 is an enlarged top perspective view of a portion of a disk drive according to an embodiment of the present invention with the latch in a closed position and the actuator in an latched position.
Figure 10:
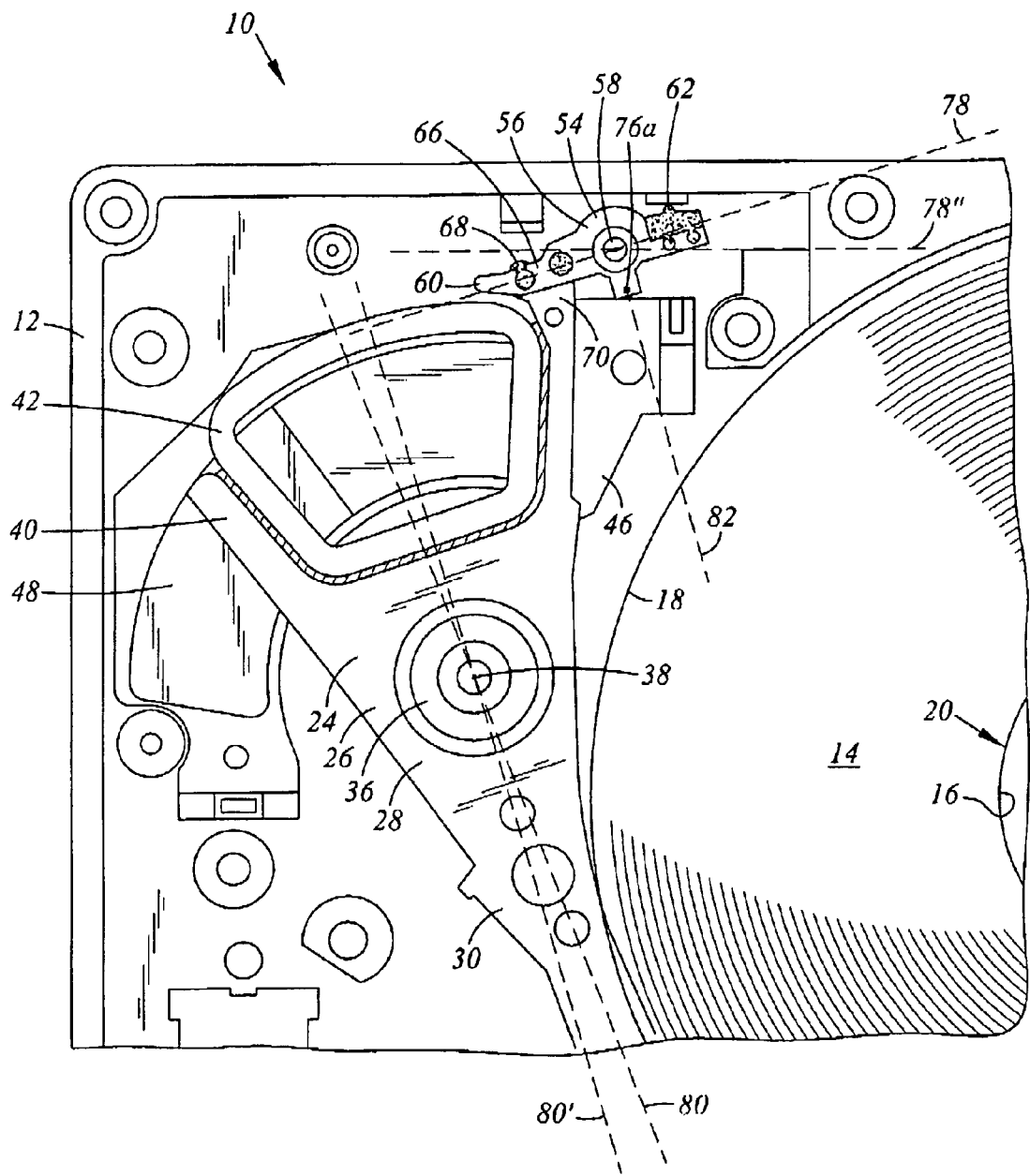
FIG. 10 is a top plan view of the portion of the disk drive of FIG. 9.
Figure 11:
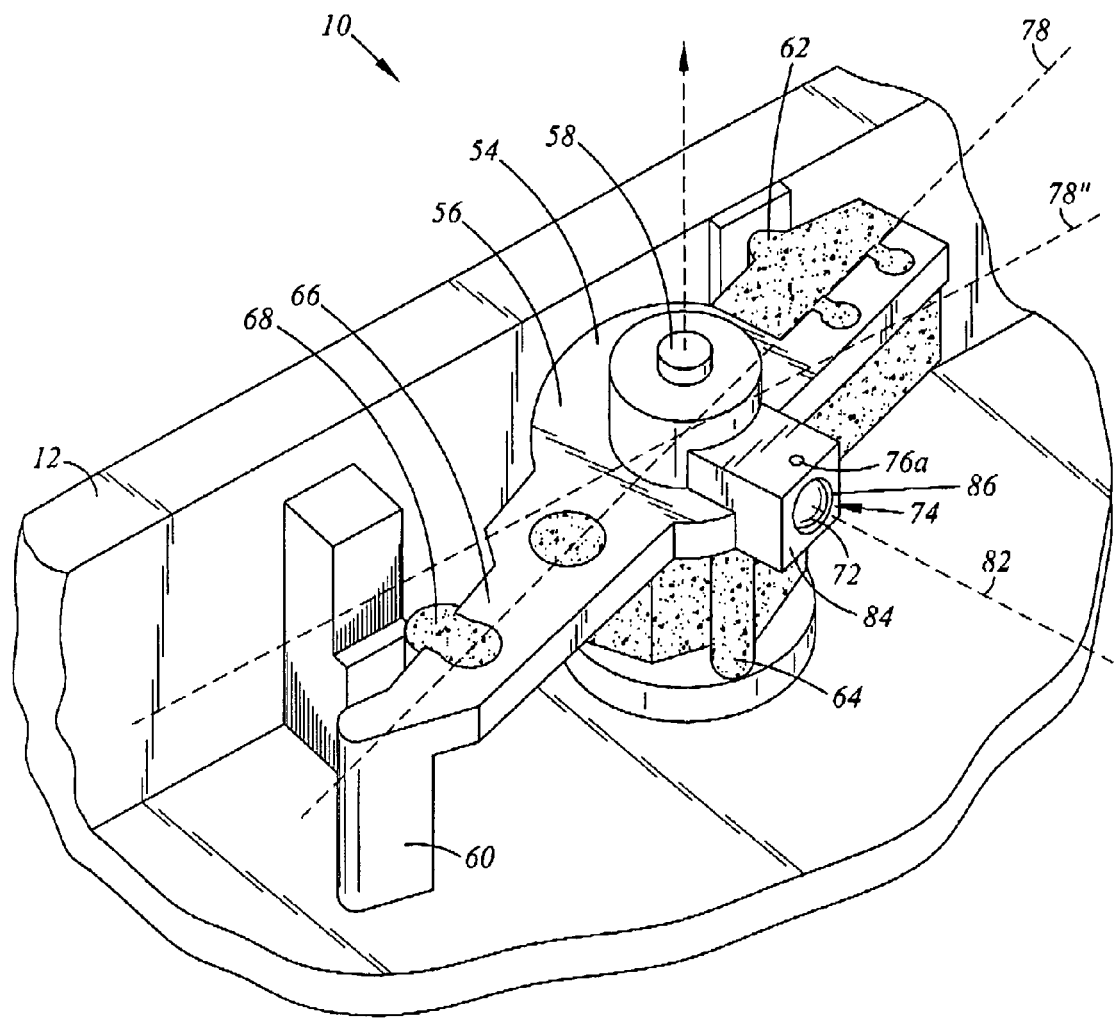
FIG. 11 is an enlarged perspective view of a portion of a disk drive according to an embodiment of the present invention, illustrating the latch in a closed position and having a biasing ball.
Figure 12:
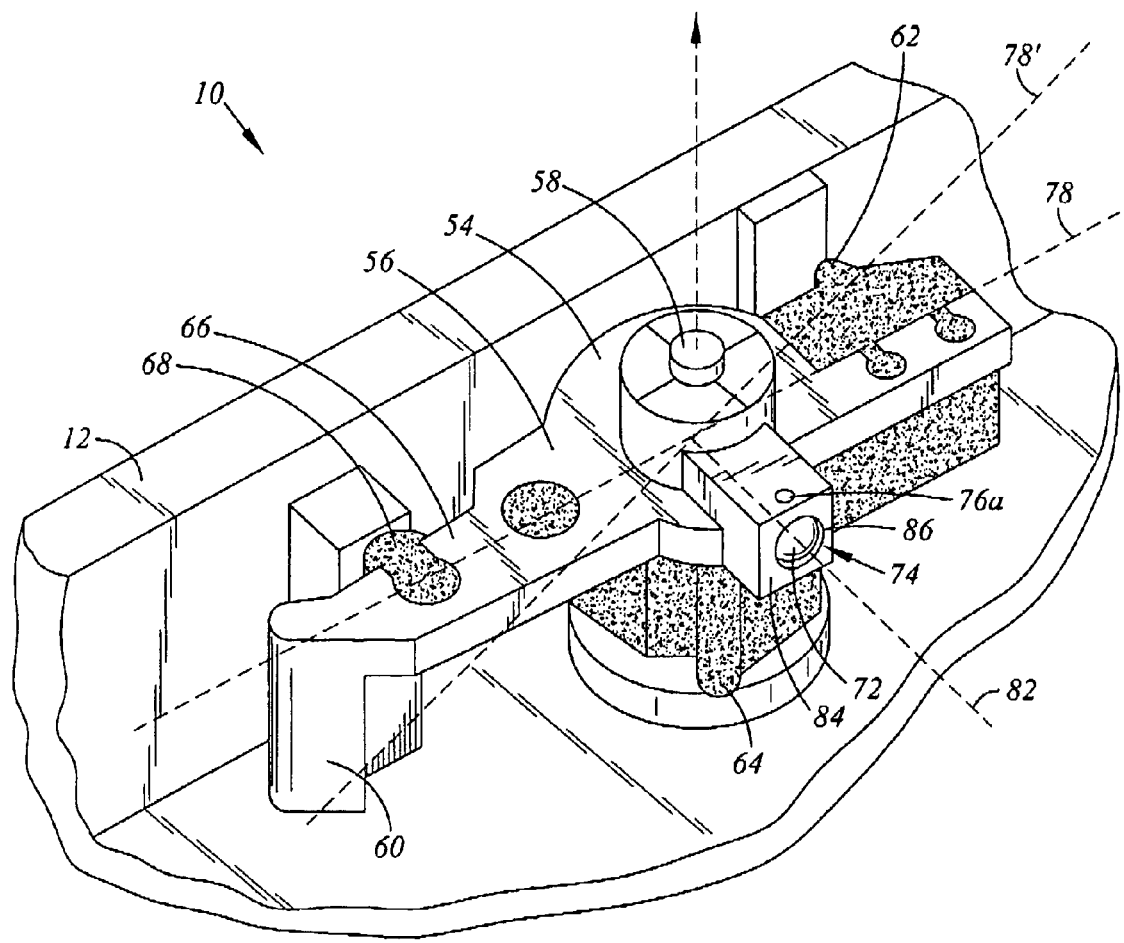
FIG. 12 is an enlarged perspective view of a portion of a disk drive according to an embodiment of the present invention, illustrating the latch in an open position.

As will be discussed in detail below, the disk drive 10 includes a latch 54. Referring now additionally to FIGS. 3-12, FIG. 3 is an enlarged top perspective view of a portion of the disk drive 10 according to an embodiment of the present invention (without the top VCM plate 44 shown for ease of illustration) with the latch 54 in the closed position and a portion of the actuator 26 in the parked position. FIG. 4 is a top plan view of the portion of the disk drive 10 according to an embodiment of the present invention. FIG. 5 is an enlarged top perspective view of a portion of the disk drive 10 according to an embodiment of the present invention with the latch 54 in an open position and the actuator 26 in an operable position. FIG. 6 is a top plan view of the portion of the disk drive 10 of FIG. 5. FIG. 7 is an enlarged top perspective view of a portion of the disk drive 10 similar to that shown in FIG. 3, however, with the latch 54 in an open position and the actuator 26 in an extreme angular position (rotated fully counter-clockwise). FIG. 8 is a top plan view of the portion of the disk drive 10 of FIG. 7. FIG. 9 is an enlarged top perspective view of a portion of the disk drive 10 according to an embodiment of the present invention with the latch 54 in a closed position and the actuator 26 in a latched position. FIG. 10 is a top plan view of the portion of the disk drive 10 of FIG. 9. FIGS. 11 and 12 are enlarged perspective views of a portion of the disk drive 10 according to an embodiment of the present invention, illustrating the latch 54 respectively in the closed and in the open positions.

The latch 54 includes a latch body 56. The latch 54 is coupled to the disk drive base 12. In this embodiment the latch 54 is rotatably coupled to the disk drive base 12. The disk drive 10 may further comprise a latch post 56 extending from the disk drive base 12 into the latch body 56. The latch 54 may be disposed about the latch post 56 through a post hole in the latch 54. It is contemplated that the latch 54 may be coupled to the disk drive base 12 in other configurations and may move with a linear sliding contact between the latch 54 and the disk drive base 12, for example.

The latch 54 includes a catch portion 60 in contact with the actuator 26 with the latch 54 in a closed position. The catch portion 60 is not in contact with the actuator 26 with the latch 54 in an open position. The latch 54 further includes a first stop portion 62 and a pusher portion 64. The first stop portion 62 is in contact with the disk drive base 12 with the latch 54 in the closed position. The first stop portion 62 is not in contact with the disk drive base 12 with the latch 54 in the open position. The pusher portion 64 is in contact with the 26 actuator with the latch 54 in the closed position and with the actuator 26 in an extreme rotational position.

The latch 54 may include a latch arm 66. The latch 54 may further comprise a second stop portion 68 in contact with the disk drive base 12 with the latch 54 in the open position. The second stop portion 68 is not in contact with the disk drive base 12 with the latch 54 in the closed position.

In the embodiment shown, the actuator 26 includes a catch 70 configured to engage the catch portion 60 of the latch 54. The catch portion 60 may be of various shapes and sizes and be configured to engage the actuator 26 in alternate ways. For example, the catch portion 60 need not be configured to receive the catch 70 in the form of a hook. The catch portion 60 could be formed as a hook and the catch 70 could be formed to receive such hook. It is contemplated that the catch 70 may be of other configurations such as a tang or pin.

The latch 54 further includes biasing ball 72. In the embodiment shown, the latch 54 is biased to the open position. The biasing ball 72 comprises a magnetic material. For example, the biasing ball 72 may be a ferromagnetic metal material, such as a steel ball bearing (e.g. 400 series stainless steel). The biasing ball 72 magnetically interacts with the VCM magnet 48. Such magnetic interaction with the biasing ball 72 results in a biasing force upon the latch 54. In the embodiment depicted, the biasing ball 72 and the VCM magnet 48 are configured to be magnetically attracted towards each other. It is contemplated that the latch 54 could be configured in another embodiment to be biased in a closed position. Further, in another embodiment, the biasing ball 72 could be configured to be magnetically repulsed rather than attracted.

Referring now to the embodiment of FIGS. 1-4, as mentioned above, for angular reference purposes each actuator arm 30 may define an actuator arm longitudinal axis 80. Similarly, for angular reference purposes the latch arm 66 is shown to define a latch arm longitudinal axis 78. The actuator 26 is depicted in a parked position (i.e. rotated fully in a clockwise direction with the heads 34 positioned radially beyond the outer diameter 18 of the disks 14). The actuator 26 comes to rest in the parked position when not performing read or write operations. The latch 54 is depicted in a closed position and is rotated fully in a counter-clockwise direction. The actuator 26 is disposed in contact with the pusher portion 64. In particular, the backside of the catch 70 is in contact of the pusher portion 64. Because the first stop portion 62 of the latch 54 is disposed in contact with the disk drive base 12, this configuration prevents the actuator 26 from rotating any further in the clockwise direction.

Referring now to FIGS. 5 and 6, there is depicted the actuator 26 in an example operable position with the heads 34 positioned somewhere between in the inner diameter 16 and the outer diameter 18 of each of the disks 14. The actuator 26 is shown as having been rotated counter-clockwise from the parked position. An actuator arm longitudinal axis 80' is superimposed for reference purposes to indicate the positioning of the actuator arm longitudinal axis 80 as it had been with the actuator 26 in the parked position. It is assumed that the actuator 26 has been rotated by a controlled VCM induced movement during normal operation of the actuator 26 in performing its read or write operations. As the actuator rotates away from the parked position, the latch 54 also begins to rotate from the closed position in a clockwise direction. This is because, in the particular embodiment shown, the latch 54 is biased to the open position. As such, by the time the actuator 26 is rotated near the location of the catch portion 58, the latch 54 has rotated to the open position with the catch portion 58 at a location where the catch portion 58 is not capable of contacting the catch 70 of the actuator 26.

Referring now to FIGS. 7 and 8, there is depicted the actuator 26 having been fully rotated in a clockwise direction with the heads 34 adjacent the inner diameter 16. An actuator arm longitudinal axis 80" is superimposed for reference purposes to indicate the position of the actuator arm longitudinal axis 80 as it had been with the actuator 26 in the example operational position as shown in FIGS. 5 and 6.

It is contemplated that the disk drive 10 may be exposed to external forces, such as a mechanical shock event. Such an external force may result in a substantial rotational acceleration having a component about an axis that is parallel to the axis of rotation 38. Where the direction of such rotational acceleration component is such that the disk drive 10 rotates in a clockwise direction (as seen in the views of FIGS. 1 and 2), the actuator 26 would tend to rotate relative to the rest of the disk drive 10 in a counter-clockwise direction. Rotation of the actuator 26 in such a direction could result in the heads 34 being undesirably moved over the disks 14 in a rapid uncontrolled manner resulting in contact between the heads 34 and the disk 14.

However, referring now to FIGS. 9 and 10, when the actuator 26 is rapidly rotated under such conditions, the actuator 26 becomes latched with the actuator 26 in contact with the catch portion 58 such as shown. This is because the latch 54 is still in the closed position and the force is not strong enough to rotate the latch 54 to the open position by the time the actuator 26 is rotated.

Figure 13:
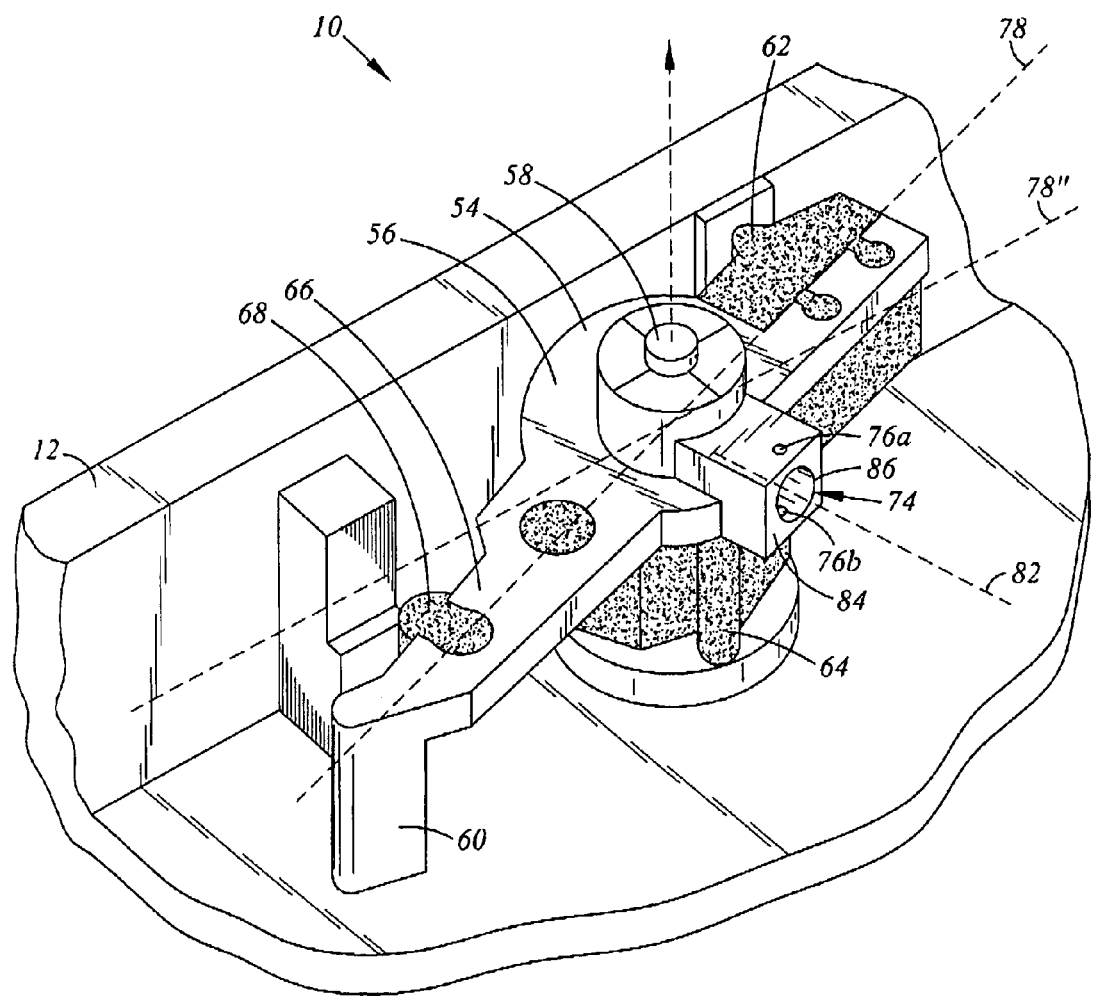
FIG. 13 is the portion of the disk drive of FIG. 11 with the latch without the biasing ball.
Figure 14:
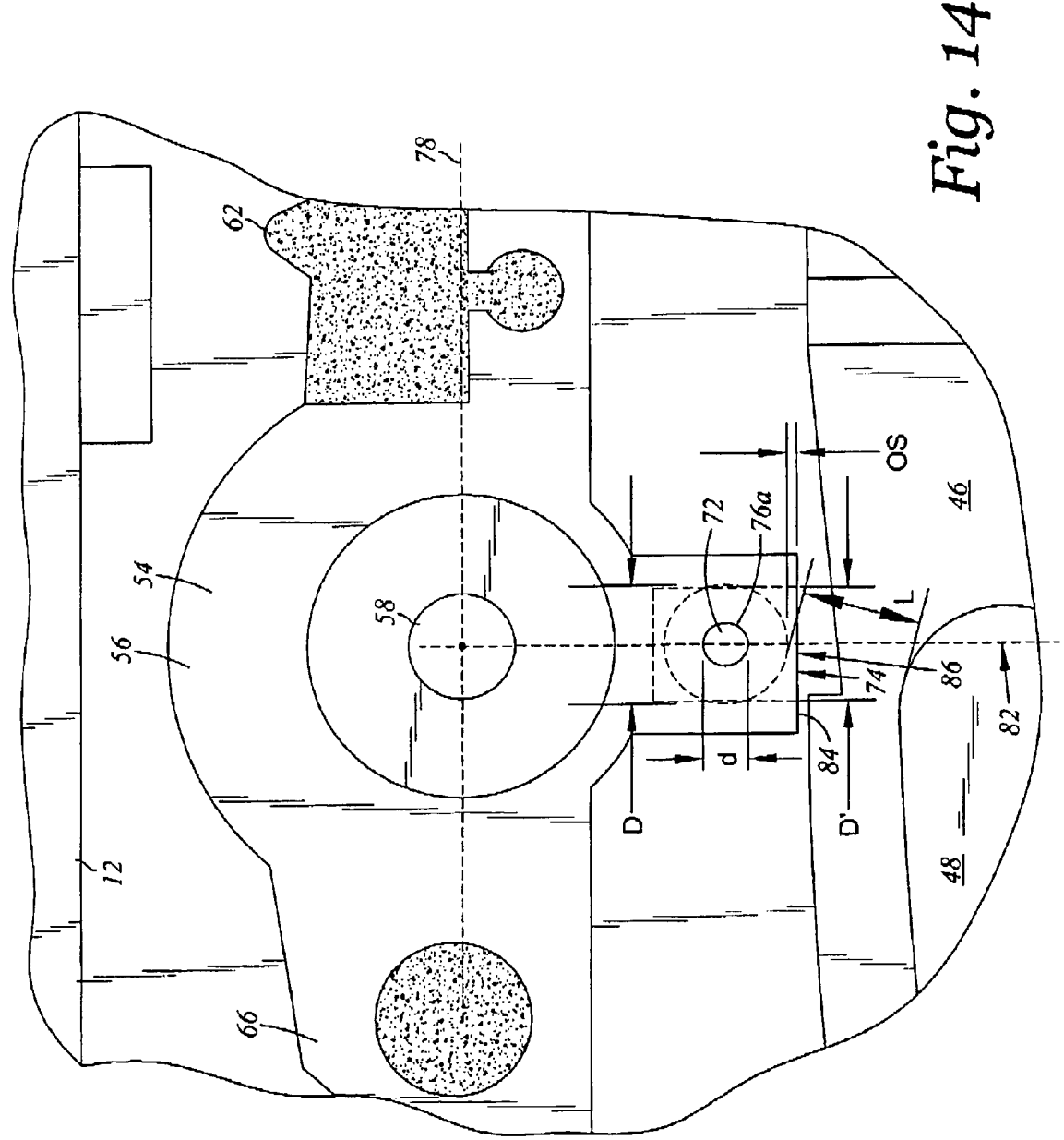
FIG. 14 is a top plan view of a portion of the latch including the biasing ball (indicated in dashed lining)

FIGS. 11 and 12 are enlarged perspective views illustrating the latch 54 in a closed position and an open position, respectively. Referring now additionally to FIG. 13, there is depicted a view similar to FIG. 12, however, without the biasing ball 72. FIG. 14 is a top plan view of a portion of the latch 54 including the biasing ball 72 (indicated in dashed lining).

The latch 54 further includes a retention bore 74 and a seating cavity 76 as embodied in a pair of recessions individually denoted 76a and 76b as illustrated in the perspective view of FIG. 13. The retention bore 74 extends into the latch body 56 along a bore longitudinal axis 82. The retention bore 74 includes a ball entrance 86. The ball entrance 86 defines a ball entrance diameter (D') (as indicated in FIG. 14). The seating cavity 76 extends from within the retention bore 74 into the latch body 56. The seating cavity 76 has an interior dimension perpendicular to the bore longitudinal axis 82 greater than the ball entrance diameter (D'). The biasing ball 72 is disposed at least partially in the retention bore 74 and at least partially within the seating cavity 76. The biasing ball 72 comprises a ferromagnetic material. The biasing ball 72 has a ball diameter (D). The ball diameter (D) is greater than the ball entrance diameter (D').

As mentioned above, the seating cavity 76 has an interior dimension measured perpendicular to the bore longitudinal axis 82 that is greater than the ball entrance diameter (D'). In this regard, in the view of FIG. 13, the seating cavity 76 extends upwardly into the individually denoted seating cavity 76a and extends downwardly into the individually denoted seating cavity 76b. As used herein, "interior" refers to the interior of the latch 54. As used herein, the interior dimension being measured perpendicular to the bore longitudinal axis 82 can refer to measurement along a radial direction from the bore longitudinal axis 82. In the embodiment of FIG. 13, the seating cavities 76a, 76b both extend completely through the latch body 56. As such, the seating cavity 76 has an interior dimension perpendicular to the bore longitudinal axis 82 greater than the ball entrance diameter (D'). The interior dimension of the seating cavity 76 being greater than the ball entrance diameter (D') facilitates the biasing ball 72 to extend partially into the seating cavity 76 beyond the radial extent of the retention bore 74 and to seat partially within the seating cavity 76.

As further mentioned above, the ball diameter (D) is greater than the ball entrance diameter (D'). This contemplates an interference fit when assembling the biasing ball 72 into the latch 56 through the ball entrance 86. An example relative sizing of the ball diameter (D) being greater than the ball entrance diameter (D') would be between 0.5% and 5.5% of the ball diameter (D). An example range of the ball diameter (D) is between 0.5 mm and 3.0 mm. The retention bore 74 includes a retention bore diameter. The retention bore diameter may be equal to the ball entrance diameter (D'). When the biasing ball 72 is installed into the latch 56, the retention bore 74 may undergo some degree of deformation, which may be plastic deformation, elastic deformation, or a combination of both.

The latch body 56 may be formed of various materials. For example, the latch body 56 may comprise a plastic material. It is preferable that the latch body 56 at the retention bore 74 is formed of a material that has a hardness value less than that of the biasing ball 72. This would facilitate a relative ease of insertion of the biasing ball 72 into the retention bore 74. It is noted, however, that the biasing ball 72 need not be inserted through the retention bore 74 for installation of the biasing ball 72 at the seating cavity 76.

In the embodiment of FIGS. 1-14, the retention bore 74 is cylindrical shaped and has a substantially uniform diameter. It is contemplated that the retention bore 74 may have other shapes, surface contours, and relative sizing.

In the embodiment shown in FIGS. 1-14, the seating cavity 76 takes the form of two recessions individually denoted as seating cavity 76a and seating cavity 76b. The seating cavity 76 may be implemented with only one of seating cavities 76a or 76b.

The seating cavity 76 has a longitudinal extent (d) that is parallel to the bore longitudinal axis 82. In certain embodiments, the longitudinal extent (d) of the seating cavity 76 may be between 5% and 30% of the ball diameter (D).

Further example sizing is that a portion of the biasing ball 72 may be disposed within 10% of the ball diameter (D) from the ball entrance 86. In the embodiment of FIGS. 1-14, the biasing ball 72 does not protrude from the ball entrance 86 (as seen from the top plan view of FIG. 14). In this embodiment, the latch body 54 includes a front face 84. The biasing ball 72 is off-set into the retention bore 74 from the front face 84 by an off-set distance (OS).

As depicted in the plan view of FIG. 14, the VCM magnet 48 is disposed adjacent the latch 54. The biasing ball 72 magnetically interacts with the VCM magnet 48 to bias the latch 54. FIG. 14 depicts the latch 54 in an open position with a minimal distance (L) between the biasing ball 72 and the VCM magnet 48. A minimal distance (L) measured along the bore longitudinal axis 82 may be less than 1.0 mm.

In the embodiment of FIGS. 1-14, the seating cavity 76 is embodied in a pair of recessions individually denoted 76a and 76b. The seating cavities 76a, 76b are in the form of holes that extend through the latch body 56. As such, the seating cavities 76a, 76b are formed through an internal surface of the retention bore 74.

Figure 15:
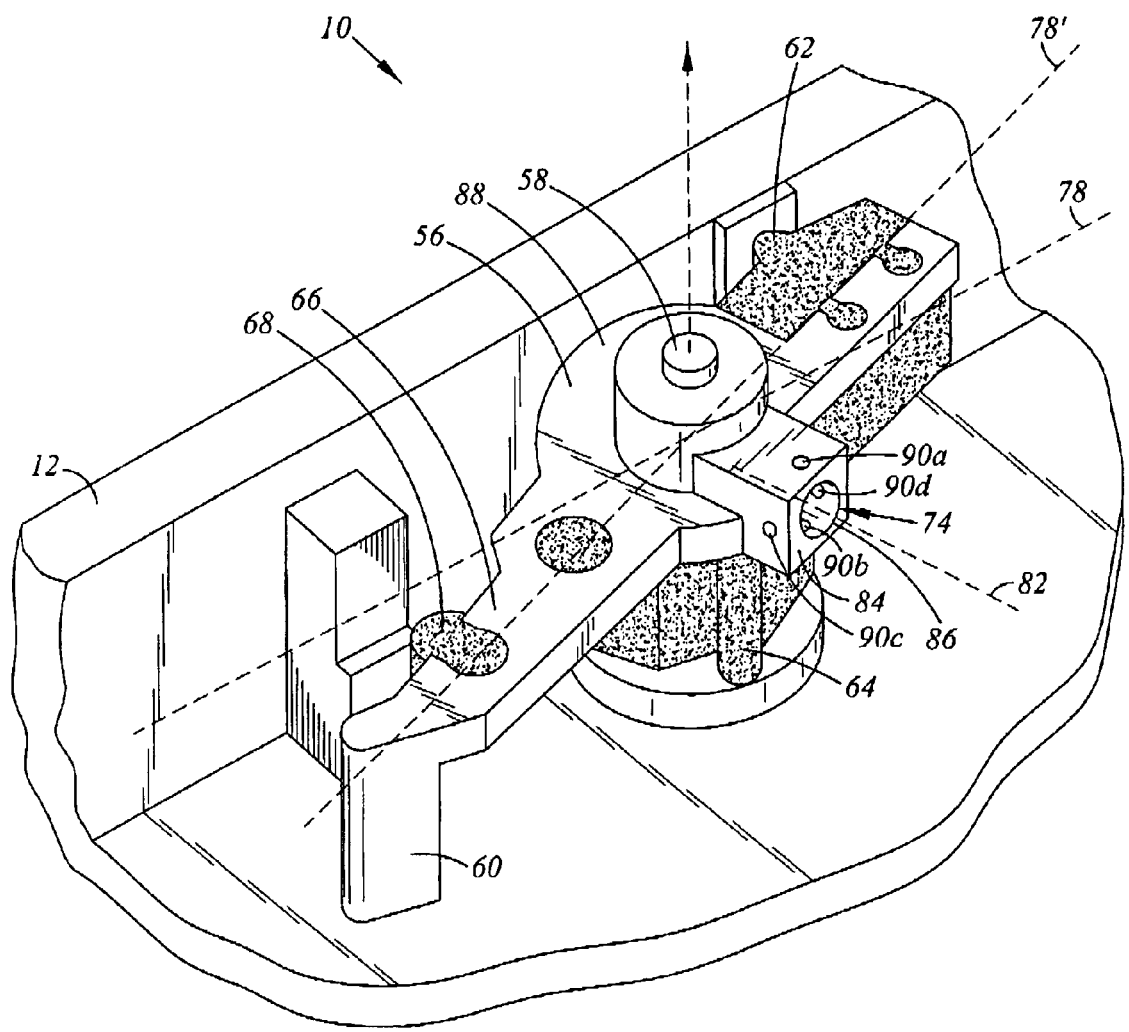
FIG. 15 is an enlarged perspective view of a portion of a disk drive according to an embodiment of the present invention, illustrating a latch a seating cavity comprising a plurality of recessions (a biasing ball is not shown)
Figure 16:
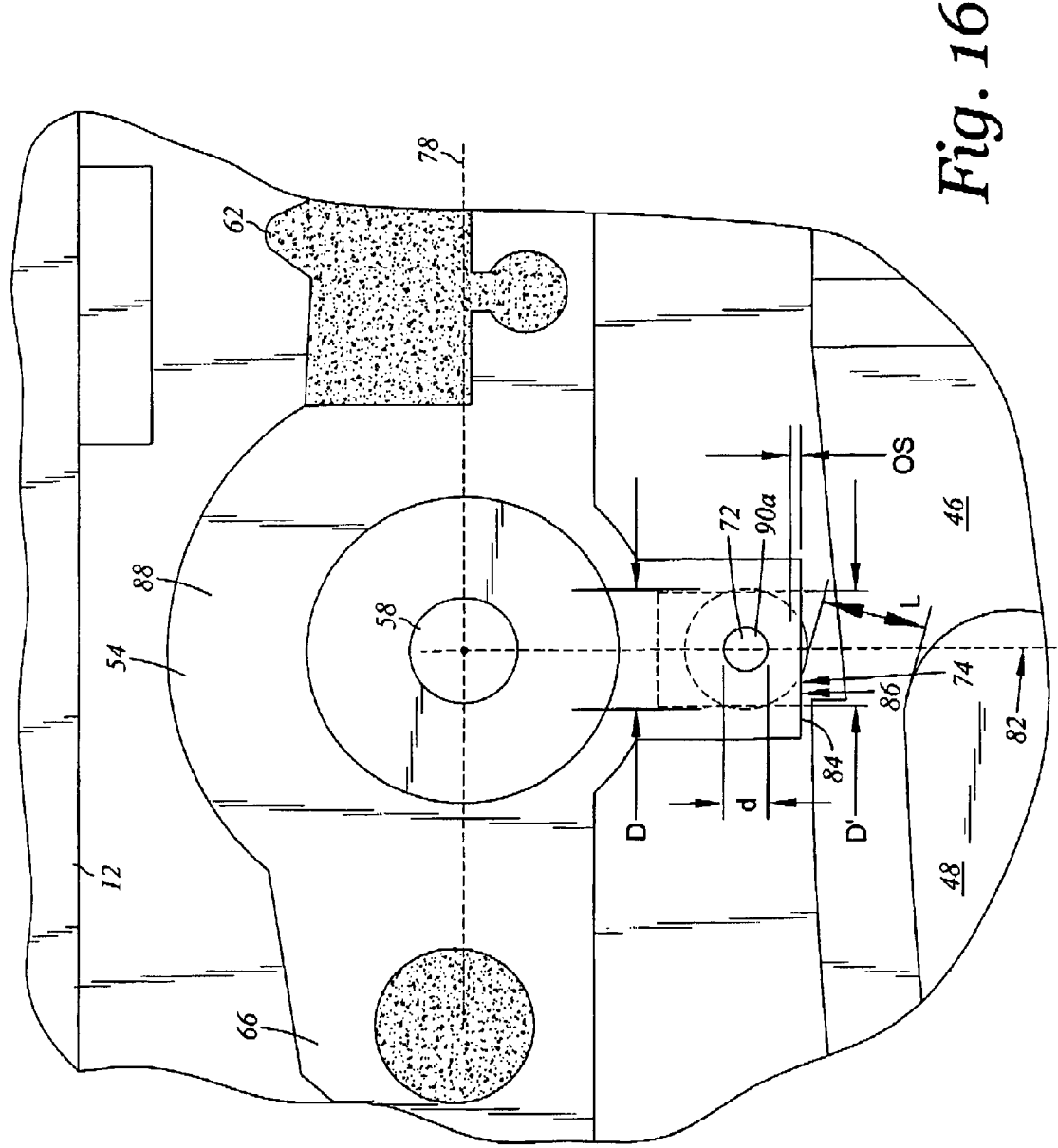
FIG. 16 is an enlarged top view of a portion of a disk drive according to an embodiment of the present invention, illustrating a latch with a biasing ball protruding from the latch (biasing ball partially indicated in dashed lining)

Referring now to FIGS. 15 and 16, there is depicted another embodiment. Similar reference numerals as those in relation to the embodiment shown in FIGS. 1-14 are used to indicate similarly configured components, however, with those differences as noted below. In this embodiment, there is provided a latch 88. The latch 88 includes a seating cavity 90 as embodied in four recessions formed in the latch body 56 as individually denoted 90a, 90b, 90c, and 90d. The seating cavities 90a-d are distributed about the biasing ball 72 (not shown in FIG. 15). As depicted in FIG. 15, a portion of the biasing ball 72 protrudes out of the retention bore 74 through the ball entrance 86. The biasing ball 72 is off-set into the retention bore 74 from the front face 84 by an off-set distance (OS). In this embodiment, a portion of the biasing ball 72 protrudes out of the retention bore 74 through the ball entrance 86 by no more than 25% of the ball diameter (D). Such protrusion is contemplated to facilitate relative reduction of a minimal distance (L) measured along the bore longitudinal axis 82 between a portion of the biasing ball 72 and the VCM magnet 48 when compared to other embodiments where the biasing ball 72 does not protrude (such as the embodiment of FIGS. 1-14).

Figure 17:
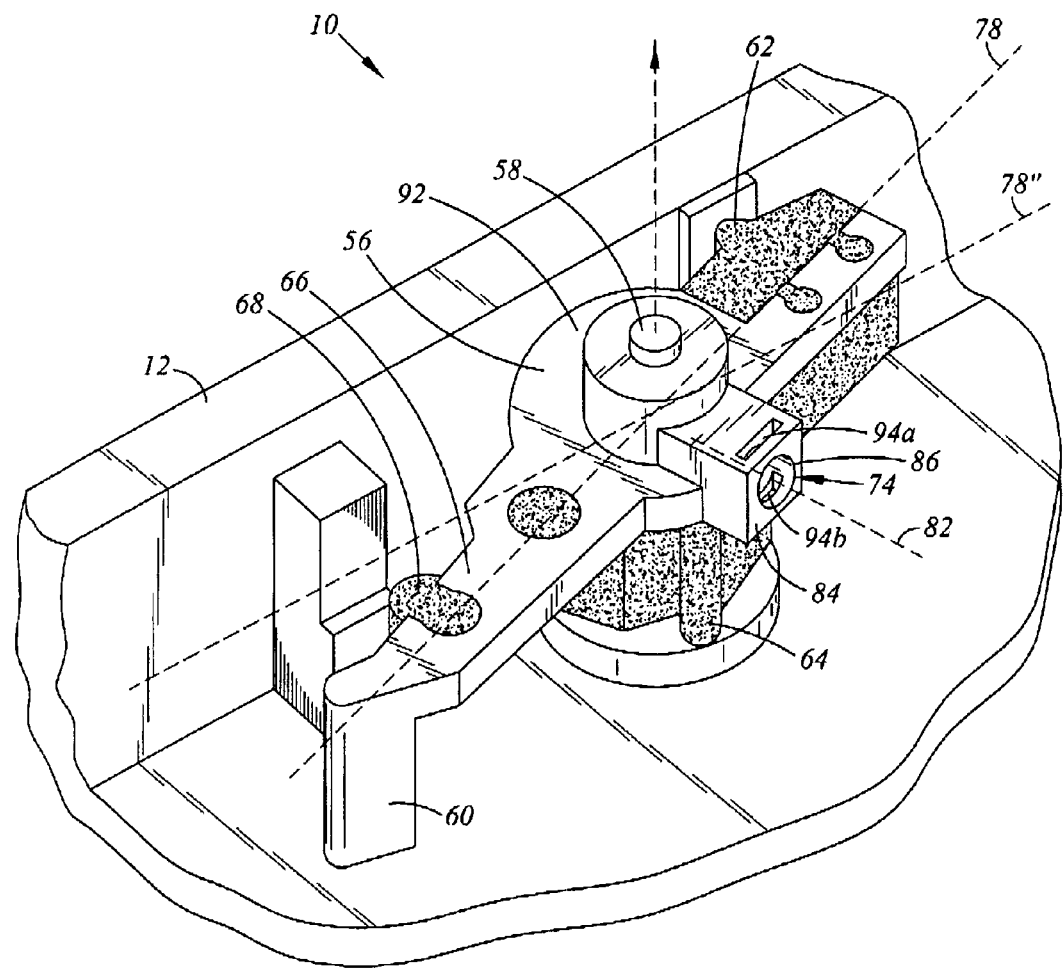
FIG. 17 is an enlarged perspective view of a portion of a disk drive according to an embodiment of the present invention, illustrating a latch with a seating cavity comprising rectangular-shaped recessions (a biasing ball is not shown)
Figure 18:
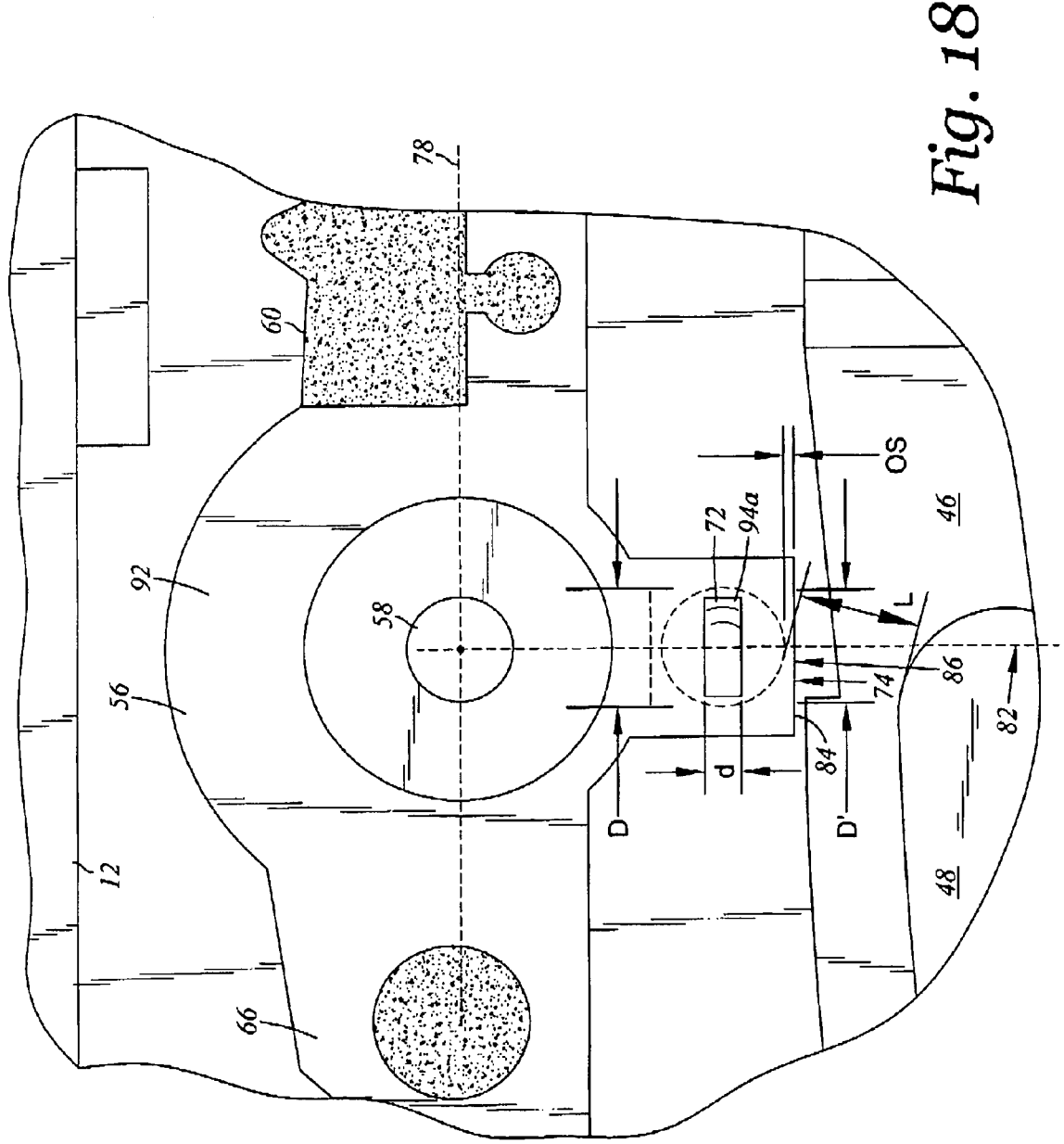
FIG. 18 is a top plan view of a portion of the latch including the biasing ball (periphery of which is indicated in dashed lining)

Referring now to FIGS. 17 and 18, there is depicted another embodiment. Similar reference numerals as those in relation to the embodiments shown in FIGS. 1-14 are used to indicate similarly configured components, however, with those differences as noted below. In this embodiment, there is provided a latch 92. The latch 92 includes a seating cavity 94 as embodied in two recessions formed in the latch body 56 as individually denoted 94a and 94b. In this embodiment the seating cavities 94a, 94b each have a rectangular shaped cross section. Other shapes and contours of the seating cavity 94 are contemplated.

Figure 19:
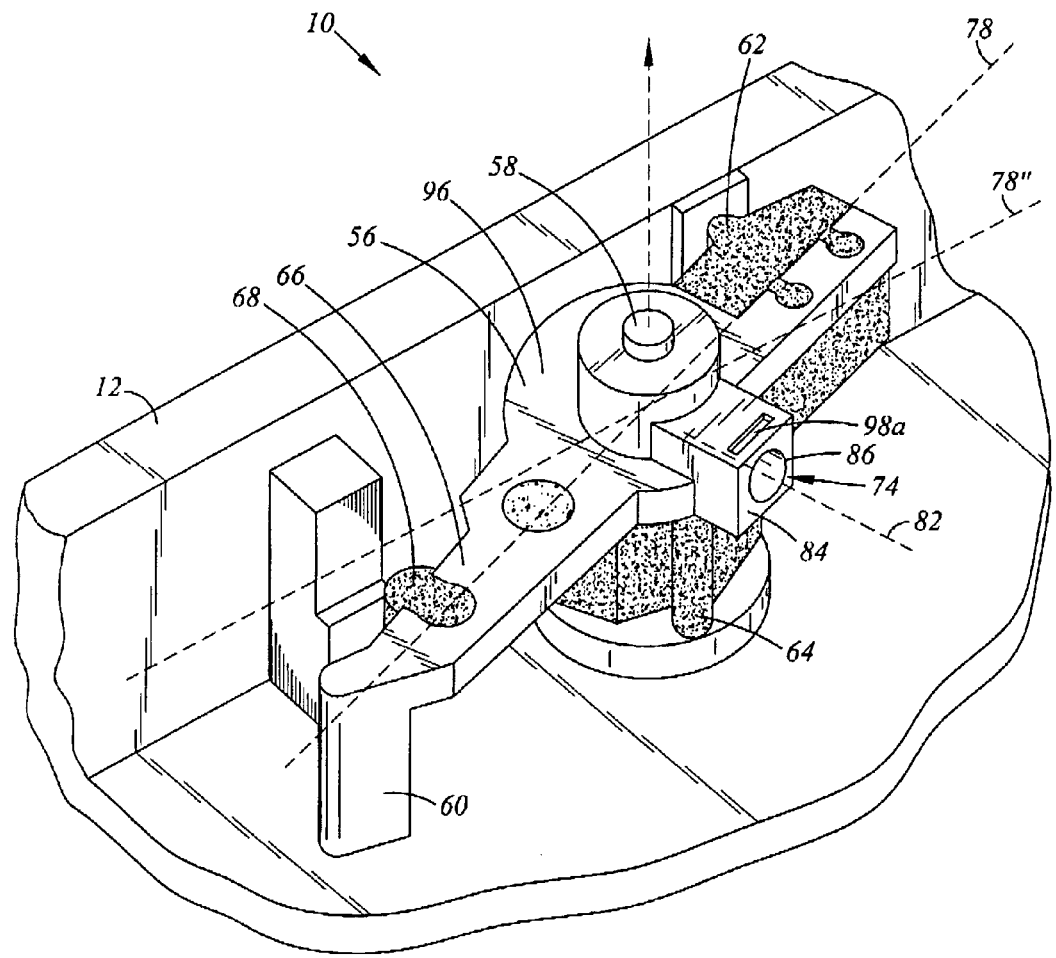
FIG. 19 is an enlarged perspective view of a portion of a disk drive according to an embodiment of the present invention, illustrating a latch with bore weakening cavities.
Figure 20:
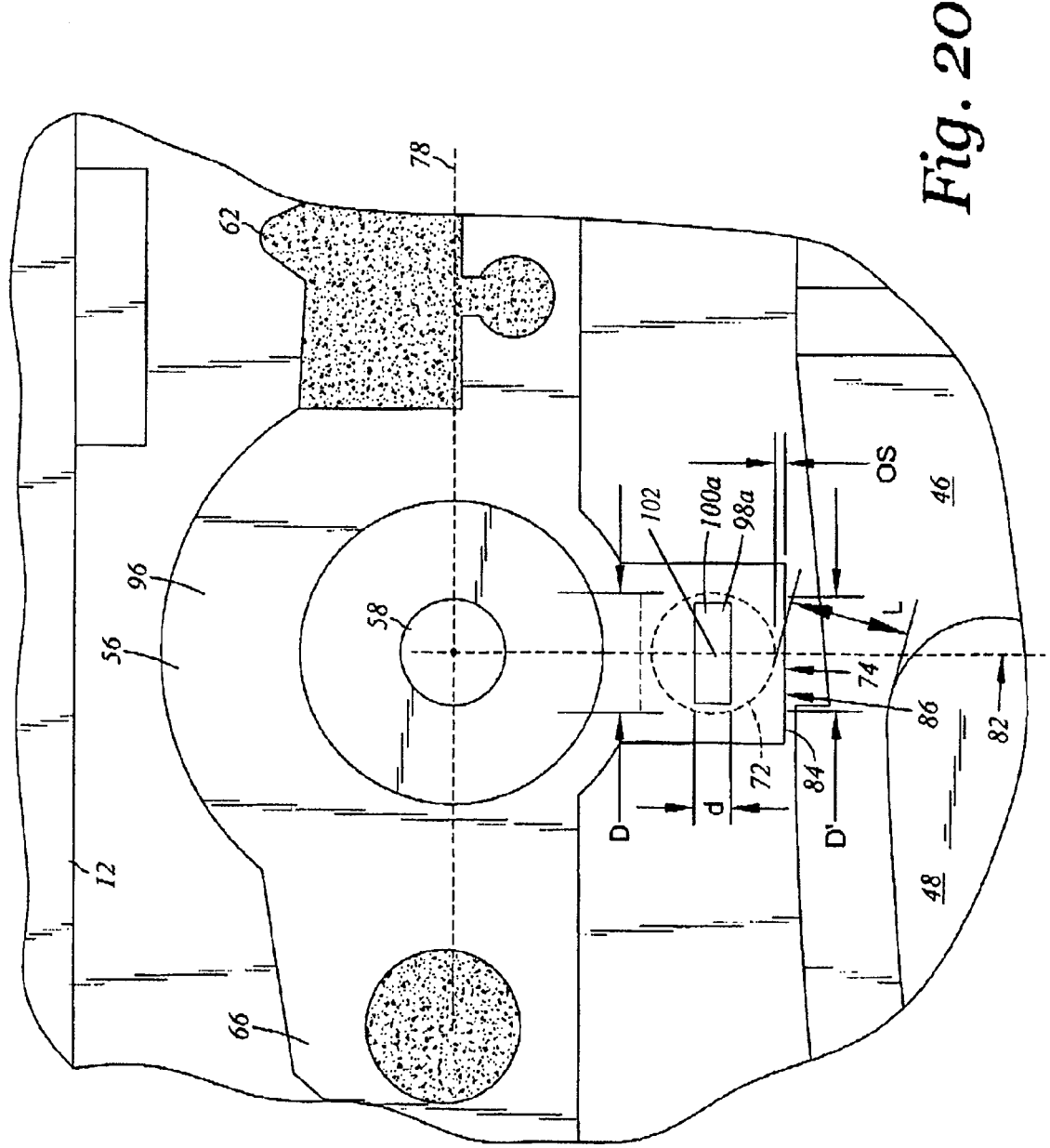
FIG. 20 is a top plan view of a portion of the latch including the biasing ball (indicated in dashed lining) and bore weakening cavities.
Figure 21:
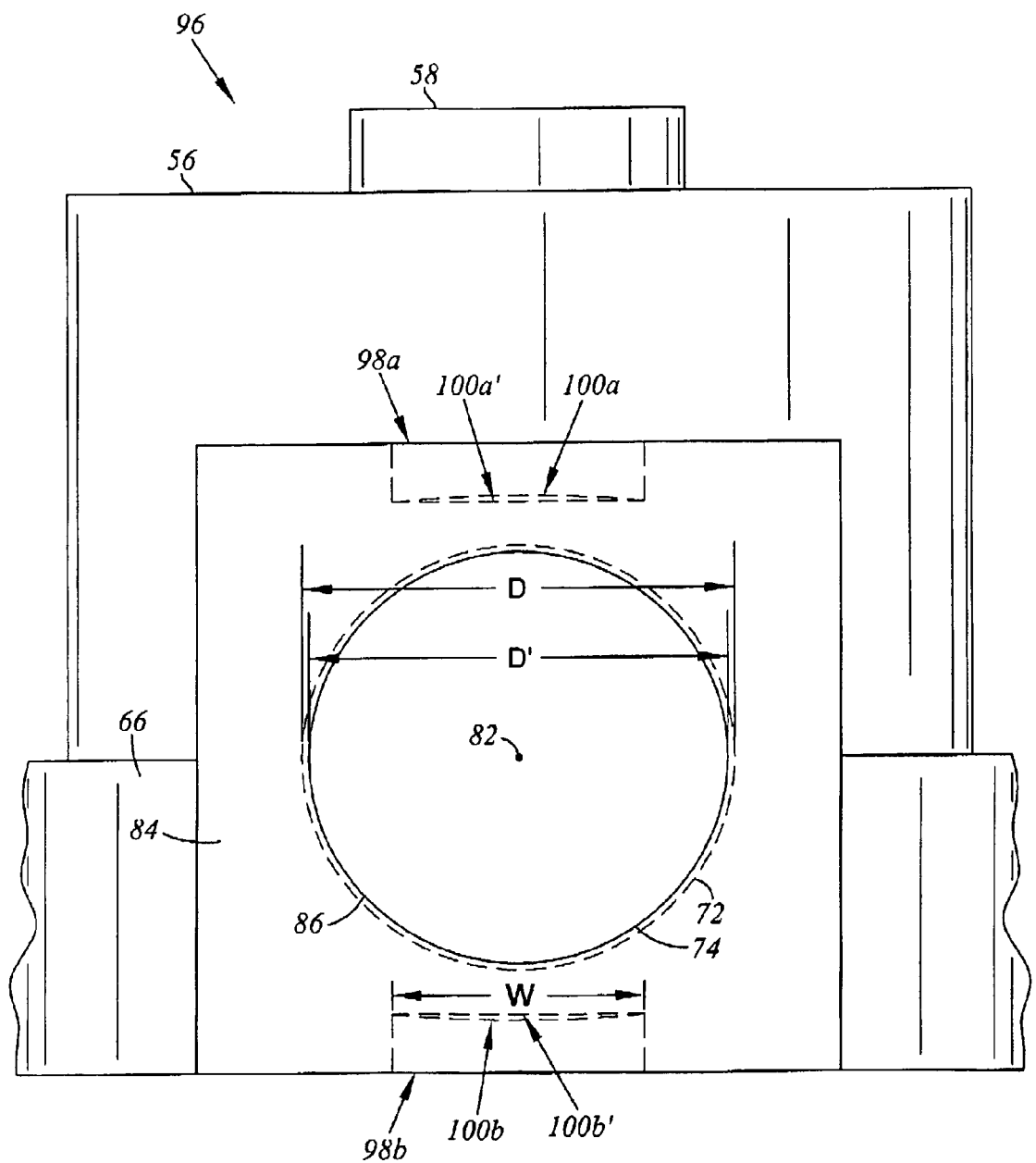
FIG. 21 is a cross sectional view of a portion of a latch with a biasing ball (periphery of which is indicated in dashed lining) and adjacent bore weakening cavities (indicated in dashed lining).

Referring now to FIGS. 19, 20 and 21, there is depicted another embodiment. Similar reference numerals as those in relation to the embodiments shown in FIGS. 1-14 are used to indicate similarly configured components, however, with those differences as noted below. According to another aspect of the present invention, there is provided the disk drive 10 that includes the disk drive base 12, the actuator 26 rotatably coupled to the disk drive base 12, and a magnet (such as VCM magnet 48) disposed adjacent the actuator 26. In this embodiment, the disk drive 10 further includes a latch 96. The latch 96 is rotatably coupled to the disk drive base 12. The latch comprises the latch body 56, the retention bore 74 and the biasing ball 72. The latch further comprises a bore weakening cavity 98 as embodied in a pair of recessions individually denoted 98a and 98b. The retention bore 74 extends into the latch body 54 along the bore longitudinal axis 82. The retention bore 74 includes the ball entrance 86 defining the ball entrance diameter (D'). The bore weakening cavity 98 extends into the latch body 54 towards the retention bore 74. The biasing ball 72 is disposed at least partially in the retention bore 74 and adjacent the bore weakening cavity 98. The biasing ball 72 comprises a ferromagnetic material. The biasing ball 72 has the ball diameter (D) that is greater than the ball entrance diameter (D'). The biasing ball 72 has a ball center 102, as depicted in FIG. 20. A radial line from the ball center 102 perpendicular to the bore longitudinal axis 82 extends into the bore weakening cavities 98a, 98b.

FIG. 19 is an enlarged perspective view of a portion of the disk drive 10 according to an embodiment of the present invention, illustrating the latch 96 with the bore weakening cavity 98a (the biasing ball 72 is not shown). FIG. 20 is a top plan view of a portion of the latch 96 including the biasing ball 72 (indicated in dashed lining) and the bore weakening cavity 98a. FIG. 21 is a cross sectional view of a portion of the latch with a biasing ball (periphery of which is indicated in dashed lining) and adjacent bore weakening cavities 98a, 98b (indicated in dashed lining).

The bore weakening cavities 98a, 98b may be axially aligned with the ball center 102. Such proximity facilitates the accommodation of the latch body 56 to be locally deformed for the biasing ball 72. Each of the bore weakening cavities 98a, 98b depicted in FIG. 21 has a cavity bottom surface 100a, 100b (the cavity bottom surface 100a is also depicted in FIG. 20). Pre-installation cavity bottom surfaces 100a', 100b' are indicated so as to illustrate by way of example a local deformation of the latch body 56.

In certain embodiments, the latch body 56 may have a maximum thickness between the retention bore 74 and the bore weakening cavity 98 of between 10% and 35% of the ball diameter (D). The maximum thickness may be measured between the retention bore 74 to both of the cavity bottom surfaces 100a, 100b. In certain embodiments, the ball diameter (D) may be greater than the ball entrance diameter (D') by between 0.5% and 5.5% of the ball diameter (D). In certain embodiments, a portion of the biasing ball 72 may be disposed within 10% of the ball diameter (D) from the ball entrance 86 at the front face 84 of the latch body 56.

In the particular embodiment shown in FIGS. 19-21, the biasing ball 72 does not protrude from the retention bore 74 through the ball entrance 86. However, in other embodiments, a portion of the biasing ball 72 may protrude out of the retention bore 74 through the ball entrance 86, preferably by no more than 25% of the ball diameter (D). A portion of the biasing ball 72 may have a minimum distance measured along the bore longitudinal axis 82 of less than 1.0 mm from the VCM magnet 48, for example.

In the embodiment of FIGS. 19-21, each of the bore weakening cavities 90a, 90b has a rectangular cross section in a plane parallel to the bore longitudinal axis 82. In certain embodiments, each of the bore weakening cavities 98a, 98b may have a span (d) of between 20% and 40% of the ball diameter (D) in a direction parallel to the bore longitudinal axis 82. However, the bore weakening cavity 98 may be formed to be of a variety of other shapes, contours and sizing. For example the bore weakening cavity 98 may have a circular cross section in a plane parallel to the bore longitudinal axis 82.

What is claimed is:

1. A disk drive comprising:
   a disk drive base;
   an actuator rotatably coupled to the disk drive base;
   a magnet disposed adjacent the actuator; and
   a latch coupled to the disk drive base, the latch comprising:
   a latch body;
   a retention bore extending into the latch body along a bore longitudinal axis, the retention bore including a ball entrance defining a ball entrance diameter;
   a seating cavity extending from within the retention bore into the latch body, the seating cavity having an interior dimension perpendicular to the bore longitudinal axis greater than the ball entrance diameter; and
   a biasing ball disposed at least partially in the retention bore and at least partially within the seating cavity, the biasing ball comprising a magnetic material, the biasing ball having a ball diameter greater than the ball entrance diameter.

2. The disk drive of claim 1 wherein the retention bore is cylindrical shaped.

3. The disk drive of claim 2 wherein the retention bore has a substantially uniform diameter.

4. The disk drive of claim 1 wherein the ball diameter is greater than the ball entrance diameter by between 0.5% and 5.5% of the ball diameter.

5. The disk drive of claim 1 wherein the ball diameter is between 0.5 mm and 3.0 mm.

6. The disk drive of claim 1 wherein the biasing ball does not protrude from the ball entrance.

7. The disk drive of claim 6 wherein a portion of the biasing ball is disposed within 10% of the ball diameter from the ball entrance.

8. The disk drive of claim 1 wherein a portion of the biasing ball protrudes out of the retention bore through the ball entrance.

9. The disk drive of claim 8 wherein the portion of the biasing ball protrudes out of the retention bore through the ball entrance by no more than 25% of the ball diameter.

10. The disk drive of claim 1 wherein the seating cavity has a longitudinal extent parallel to the bore longitudinal axis between 5% and 30% of the ball diameter.

11. The disk drive of claim 1 wherein the seating cavity extends completely through the latch body.

12. The disk drive of claim 1 wherein the seating cavity includes a plurality of recessions in an internal surface of the retention bore.

13. The disk drive of claim 12 wherein at least one of the plurality of recessions is cylindrical shaped.

14. The disk drive of claim 12 wherein at least one of the plurality of recessions has a rectangular shaped cross section.

15. The disk drive of claim 1 wherein the seating cavity includes a plurality of holes through the latch body.

16. The disk drive of claim 1 wherein a portion of the bias ball has a minimum distance in a plane of the bore longitudinal axis of less than 1.0 mm from the magnet.

17. The disk drive of claim 1 wherein the latch body comprises a plastic material.

18. The disk drive of claim 1 wherein the biasing ball comprise a ferromagnetic material.

19. The disk drive of claim 18 wherein the biasing ball comprises a metal material.

20. The disk drive of claim 1 wherein the latch is rotatably coupled to the disk drive base.

21. A disk drive comprising:
a disk drive base;
an actuator rotatably coupled to the disk drive base;
a magnet disposed adjacent the actuator;
a latch rotatably coupled to the disk drive base, the latch comprising:
a latch body;
a retention bore extending into the latch body along a bore longitudinal axis, the retention bore including a ball entrance defining a ball entrance diameter;
a bore weakening cavity extending into the latch body towards the retention bore; and
a biasing ball disposed at least partially in the retention bore and adjacent the bore weakening cavity, the biasing ball comprising a ferromagnetic material, the biasing ball having a ball diameter greater than the ball entrance diameter, the biasing ball having a ball center, a radial line from the ball center perpendicular to the bore longitudinal axis extending into the bore weakening cavity.

22. The disk drive of claim 21 wherein the latch body has a maximum thickness between the retention bore and the bore weakening cavity of between 10% and 35% of the ball diameter.

23. The disk drive of claim 21 wherein the retention bore is cylindrical shaped.

24. The disk drive of claim 23 wherein the retention bore has a substantially uniform diameter.

25. The disk drive of claim 21 wherein the ball diameter is greater than the ball entrance diameter by between 0.5% and 5.5% of the ball diameter.

26. The disk drive of claim 21 wherein a portion of the biasing ball is disposed within 10% of the biasing ball diameter from the ball entrance.

27. The disk drive of claim 21 wherein a portion of the biasing ball has a minimum distance in a plane of the bore longitudinal axis of less than 1.0 mm from the magnet.

28. The disk drive of claim 21 wherein the bore weakening cavity has a rectangular cross section in a plane parallel to the bore longitudinal axis.

29. The disk drive of claim 21 wherein the bore weakening cavity has a span of between 20% and 40% of the ball diameter in a direction parallel to the bore longitudinal axis.

30. The disk drive of claim 21 wherein the latch body comprises a plastic material.

31. The disk drive of claim 21 wherein the biasing ball comprise a ferromagnetic material.

32. The disk drive of claim 31 wherein the biasing ball comprises a metal material.

33. The disk drive of claim 21 wherein the latch is rotatably coupled to the disk drive base.

* * * * *